US012443792B2

(12) United States Patent
Sharma et al.

(10) Patent No.: US 12,443,792 B2
(45) Date of Patent: Oct. 14, 2025

(54) REFERENCE DRIVEN NLP-BASED TOPIC CATEGORIZATION

(71) Applicant: Oracle Financial Services Software Limited, Mumbai (IN)

(72) Inventors: Utkarsh Hemant Kumar Sharma, Mumbai (IN); Rahul Yadav, Alwar (IN); Veresh Jain, Bangalore (IN); Sharoon Saxena, Bhopal (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 275 days.

(21) Appl. No.: 18/056,463

(22) Filed: Nov. 17, 2022

(65) Prior Publication Data

US 2024/0169147 A1 May 23, 2024

(51) Int. Cl.
*G06F 40/20* (2020.01)
*G06F 16/951* (2019.01)

(52) U.S. Cl.
CPC ............ *G06F 40/20* (2020.01); *G06F 16/951* (2019.01)

(58) Field of Classification Search
CPC .................................................... G06F 16/951
See application file for complete search history.

(56) References Cited

U.S. PATENT DOCUMENTS

| 5,559,313 | A | 9/1996 | Claus et al. |
| 6,792,422 | B1 | 9/2004 | Stride et al. |
| 2009/0222365 | A1 | 9/2009 | McGlynn et al. |
| 2017/0091320 | A1 | 3/2017 | Psota et al. |

(Continued)

FOREIGN PATENT DOCUMENTS

| CA | 3055838 A1 | * | 3/2020 | ......... G06F 16/3347 |
| EP | 3683747 A1 | | 7/2020 | |

OTHER PUBLICATIONS

"BankClassify: Simple Automatic Classification of Bank Statement Entries", Robin's Blog, Available Online at: https://blog.rtwilson.com/bankclassify-simple-automatic-classification-of-bank-statement-entries/, May 14, 2018, 3 pages.

(Continued)

*Primary Examiner* — Bhavesh M Mehta
*Assistant Examiner* — Joseph J. Yamamoto
(74) *Attorney, Agent, or Firm* — Kilpatrick Townsend & Stockton LLP

(57) ABSTRACT

A method includes: obtaining a record including text narration; inputting the text narration into an NLP model; generating, by the NLP model, encoded narration based on the text narration; determining similarity index between the encoded narration and each of encoded reference topics; comparing similarity index between the encoded narration and each encoded reference topic to similarity threshold; and determining whether similarity index between the encoded narration and each encoded reference topic is equal to or greater than similarity threshold. When the similarity index is equal to or greater than the similarity threshold, a corresponding reference topic is added to a result group, and, when the similarity index is less than the similarity threshold, the corresponding reference topic is left out of the result group. The record is classified based on the reference topic included in the result group and corresponding to the encoded reference topic having greatest similarity index.

20 Claims, 17 Drawing Sheets

(56) References Cited

U.S. PATENT DOCUMENTS

| | | | |
|---|---|---|---|
| 2021/0109995 A1* | 4/2021 | Mihindukulasooriya | ............... G06F 40/247 |
| 2022/0358293 A1* | 11/2022 | Renard | ............... G06F 16/353 |
| 2022/0366374 A1* | 11/2022 | Kundapur | ............... G06F 40/30 |

OTHER PUBLICATIONS

"Bank-Statement-Analysis", Available Online at: https://github.com/apoorvpatne10/bank-statement-analysis, Sep. 8, 2019, 13 pages.

"Classifying My Bank Transactions with Unsupervised Clustering", Available Online at: https://github.com/GlenCrawford/bank_transaction_unsupervised_clustering, Feb. 15, 2020, 6 pages.

"How to Understand Your Spending", Available Online at: https://www.commbank.com.au/guidance/consumer-finance/understanding-your-spending-201705.html, Sep. 21, 2019, 5 pages.

"Kaggle: Bank Transaction Data—Extracted Bank Account Statements of Various Bank Accounts", Available Online at: https://datasetsearch.research.google.com/search?query=Bank%20transactions&docid=L2cvMTFqOWIwZnRxNg%3D%3D, Jun. 3, 2019, 2 pages.

"Source", Available Online at: https://github.com/LaurentVeyssier/Unsupervised-text-classification-with-BERT-embeddings/blob/main/unsupervised_text_classification_with_BERT.ipynb, 24 pages.

"Spend Tracker and Insights", Available Online at: https://www.commbank.com.au/digital-banking/spend-tracker-insights.html, 2022, 4 pages.

"Unsupervised-Text-Classification-with-BERT-Embeddings", Available Online at: https://github.com/LaurentVeyssier/Unsupervised-text-classification-with-BERT-embeddings, Apr. 25, 2021, 2 pages.

Chandramouli et al., "Unsupervised Paradigm for Information Extraction from Transcripts Using Bert", Available Online at: https://www.researchgate.net/publication/355060675_Unsupervised_paradigm_for_information_extraction_from_transcripts_using_BERT, Oct. 2021, 10 pages.

Cheng, "An Overview of Building a Merchant Name Cleaning Engine with SequenceMatcher and spaCy", Available Online at: https://towardsdatascience.com/an-overview-of-building-a-merchant-name-cleaning-engine-with-sequencematcher-and-spacy-9d8138b9aace, Jan. 31, 2021, 14 pages.

Dogra et al., "Banking News-Events Representation and Classification with a Novel Hybrid Model Using DistilBERT and Rule-Based Features", Turkish Journal of Computer and Mathematics Education, vol. 12, No. 10, Available Online at: https://www.turcomat.org/index.php/turkbilmat/article/view/4954/4152, 2021, pp. 3039-3054.

Folkestad et al., "Automatic Classification of Bank Transactions", Norwegian University of Science and Technology, Available Online at: https://ntnuopen.ntnu.no/ntnu-xmlui/bitstream/handle/11250/2456871/17699_FULLTEXT.pdf?sequence=1, Jun. 20, 2017, 110 pages.

Halford, "Unsupervised Text Classification with Word Embeddings", Available Online at: https://maxhalford.github.io/blog/unsupervised-text-classification/, Oct. 3, 2020, 12 pages.

Knaddison et al., "A Public Repository of Merchant Category Codes (MCC) in Formats Easier to Read Than Most Places", Available online At: https://github.com/greggles/mcc-codes, Oct. 26, 2022, 3 pages.

Ostrovsky, "Automatic Ticket Tagging with NLP Text Classification", Available Online at: https://engineering.hexacta.com/text-classification-647e2fa1ec48, Nov. 6, 2020, 13 pages.

Prabhu et al., "Multi-Class Text Classification Using BERT-Based Active Learning", Available Online at: https://www.researchgate.net/publication/351221839_Multi-class_Text_Classification_using_BERT-based_Active_Learning, Apr. 27, 2021, 7 pages.

Thielmann et al., "Unsupervised Document Classification Integrating Web Scraping, One-Class SVM and LDA Topic Modelling", Journal of Applied Statistics, 2021, pp. 1-18.

Zhao et al., "Text Classification and Topic Modeling for Online Discussion Forums: An Empirical Study from the Systems Modeling Community", Chapter 6, Advances in Data Mining and Database Management, Jan. 2020, pp. 151-186.

\* cited by examiner

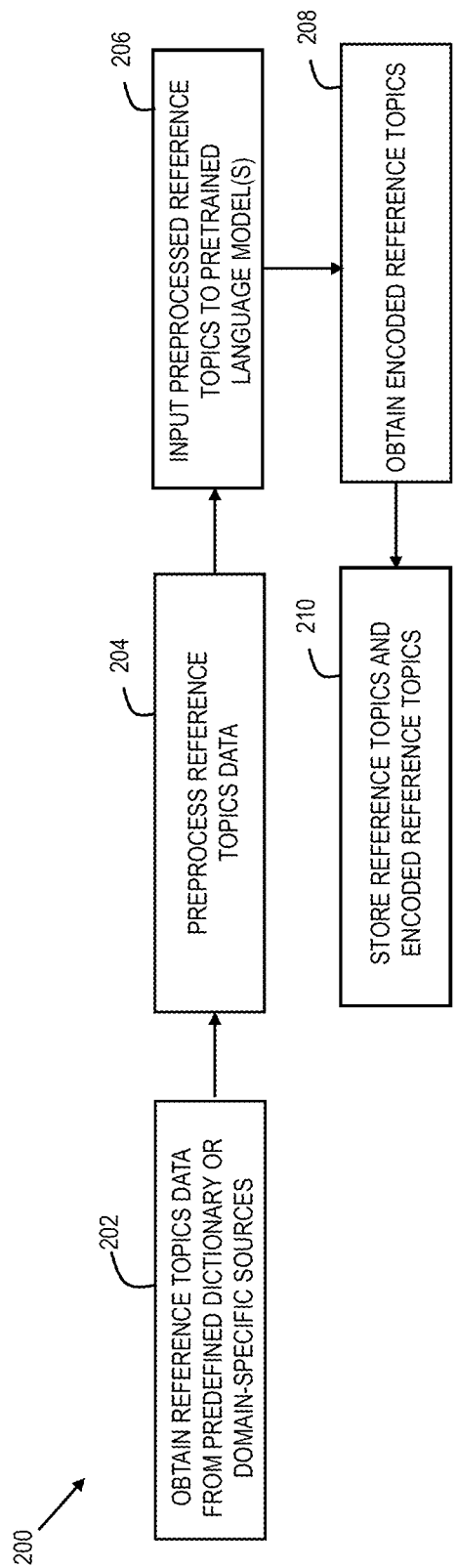

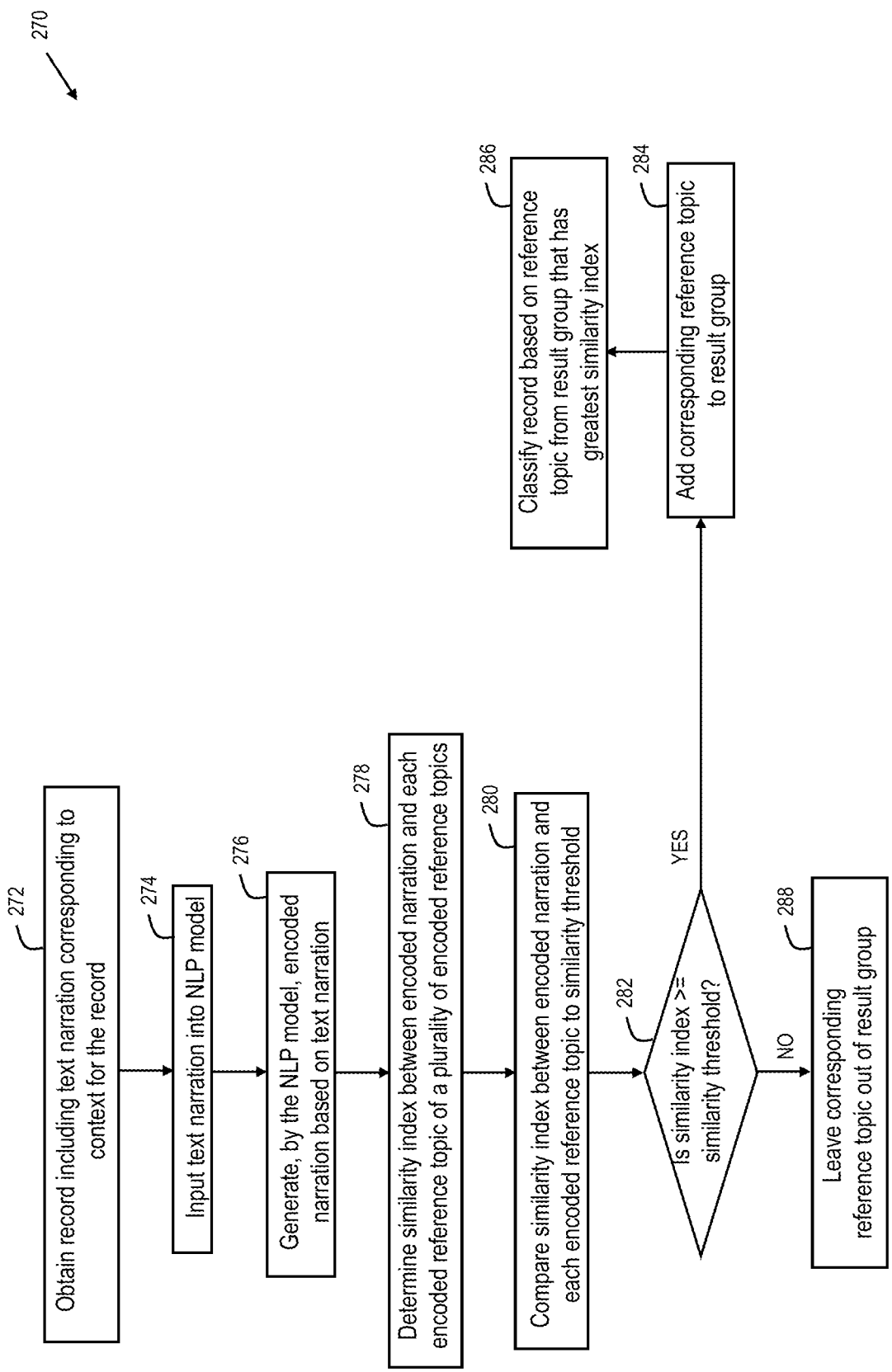

FIG. 3A

| Date | Narration | Amount | Predicted Category |
|---|---|---|---|
| 14-03-22 | GOOGLE *GOGGLE STORAGEA 888-888-3333 | Rs. 400.00 | Utility |
| 15-03-22 | PAYU=www.myntra.comA 249 Bangalore | Rs. 1020.31 | Online Shopping |
| 16-03-22 | UPI/7770755550999/Kite deposit 67/zerodhabroking@/H | Rs. 3400.52 | Investment |
| 17-03-22 | BIL/oNL/000077704444/ZERODHA/3333377000007777 | Rs. 600.45 | Investment |
| 18-03-22 | NFs/BLopmso/cAsH WDL/30-06-60 | Rs. 5000.00 | Cash Withdrawal |

FIG. 3B

| DATE | TRANSACTION DETAILS | DEPOSIT AMT | | PREDICTED CATEGORY |
|---|---|---|---|---|
| 05-Jul-17 | TRF FROM Indiaforensic SERVICES | 1,000,000.00 | ⇑ | Fund Transfer |
| 16-Aug-17 | FDRIJINTERNAL FUND TRANSFE | 8,500,000.00 | | Fund Transfer |
| 16-Aug-17 | INDO GIBL Indiaforensic STL03071 | 6,000,000.00 | | Investment |
| 30-Sep-16 | 709002333825 : Closure Pr | 100,000,000.00 | | Closing Purchase Requisition |
| 03-Oct-16 | 56689011: Full Time Employee - Salaries | 200,540,000.00 | | Employee Payroll |

FIG. 3C

| Items | Cost | | Predicted Category |
|---|---|---|---|
| Parle G | 80 | ↑ | Biscuits |
| Wheel Washing Powder | 55 | | Detergents |
| Good day | 65 | | Biscuits |
| Top ramen | 70 | | Instant Noodles |
| Maggi | 40 | | Instant Noodles |

320 → (Items table)
322 → (Predicted Category)
324 → (Parle G row)

FIG. 3D

| MCC | MERCHANT CATEGORY |
|---|---|
| 0742 | Veterinary Services |
| 0763 | Agricultural Co-operatives |
| 0780 | Horticultural Services, Landscaping Services |
| 1520 | General Contractors-Residential and Commercial |

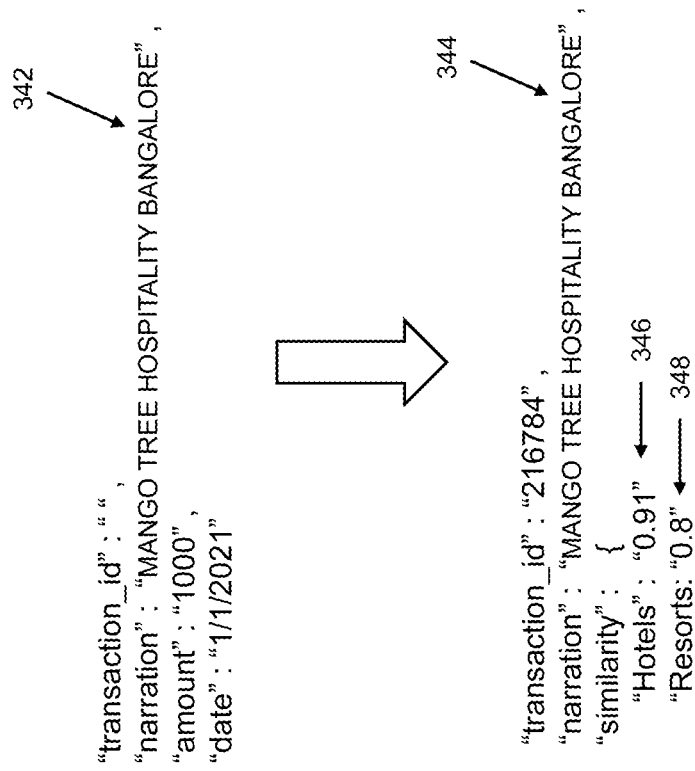

```
360
[(<h3 class="zBAuLc 197dzf"><div class="BNeawe deIvCb AP7Wnd">Sai Mango Tree</div></h3>,
<h3 class="zBAuLc 197dzf"><div class="BNeawe deIvCb AP7Wnd">Salt Mango Tree</div></h3>,
<h3 class="zBAuLc 197dzf"><div class="BNeawe deIvCb AP7Wnd">Mango Hotels - Purple Brigade</div></h3>,
<h3 class="zBAuLc 197dzf"><div class="BNeawe vvjwJb AP7Wnd">Mango Trees, JP Nagar, Bangalore - Zomato</div></h3>,
<h3 class="zBAuLc 197dzf"><div class="BNeawe vvjwJb AP7Wnd">MANGO TREES, Bengaluru - Menu, Prices & Restaurant Reviews
</div></h3>,
<h3 class="zBAuLc 197dzf"><div class="BNeawe vvjwJb AP7Wnd">Mango Tree - JP Nagar - Dineout</div></h3>,
<h3 class="zBAuLc 197dzf"><div class="BNeawe vvjwJb AP7Wnd">Mango Hotels - Purple Brigade Bangalore at ₹ 2672 - Goibibo</div
></h3>,
<h3 class="zBAuLc 197dzf"><div class="BNeawe vvjwJb AP7Wnd">Mango Hotels - Purple Brigade Best Rates on Bangalore Hotel ...
</h3>,
<h3 class="zBAuLc 197dzf"><div class="BNeawe vvjwJb AP7Wnd">Mango Tree - North Indian Restaurant in ConventionCenter</div>
</h3>,
<h3 class="zBAuLc 197dzf"><div class="BNeawe vvjwJb AP7Wnd">Mango Tree Hospitality Ventures - Tikshare</div></h3>,
<h3 class="zBAuLc 197dzf"><div class="BNeawe vvjwJb AP7Wnd">Mango Tree - JP Nagar - Bangalore Photos - MouthShut.com</div>
</h3>,
<h3 class="zBAuLc 197dzf"><div class="BNeawe vvjwJb AP7Wnd">Sri Sai Mango Tree Restaurant, Bellandur, Bangalore - Justdial
</div></h3>,
<h3 class="zBAuLc 197dzf"><div class="BNeawe vvjwJb AP7Wnd">Salt Mango Tree: Traditional kerala cuisine in Indiranagar</div
></h3>]
```

REFERENCE DRIVEN NLP-BASED TOPIC CATEGORIZATION

FIELD

The present disclosure relates generally to artificial intelligence (AI), and, more particularly, to topic categorization of records using unsupervised natural language processing (NLP) techniques.

BACKGROUND

Artificial intelligence has many applications. For example, using artificial intelligence models or algorithms, content records can be categorized into categories or topics, where each record may correspond to a topic or a sub-topic. As an example, the topic may be "shopping," and the sub-topic may be "clothes shopping" or "grocery shopping."

However, the records, such as transactions, differ by the publishing entity, e.g., a bank, a user, an organization, etc. As such, the records have variable context, inconsistent terminology, and inconsistent formats, e.g., data fields. Further, the content data in the records can be abbreviated or obfuscated. Accurately identifying meaningful content in the unstructured records and categorizing the records into correct topics, e.g., categories, are challenging tasks.

In addition, while some categories for the records of the established entities may be well defined, the categories for the records of new entities, e.g., a new merchant, are not defined. This creates a so-called cold start problem in the related art methods where the model cannot classify a record because a category for the business or service described in the record is not defined prior to the model attempting the classification.

SUMMARY

Techniques are provided for accurately and efficiently categorizing records into a plurality of topics using unsupervised machine learning techniques. Techniques described herein use a reference driven NLP-based topic categorization to efficiently make accurate determinations regarding the categories of the records. Additionally, techniques described herein streamline the process of categorizing any type of the record, e.g., any type of transaction, and eliminate a problem of the related art known as the cold start when the relevant domain information corresponding to the narration of the record is unavailable.

Various embodiments are described herein, including methods, systems, non-transitory computer-readable storage media storing programs, code, or instructions executable by one or more processors, and the like.

In various embodiments, a computer-implemented method includes obtaining a record including a text narration corresponding to context for the record; inputting the text narration into a natural language processing (NLP) model; generating, by the NLP model, an encoded narration based on the text narration; determining a similarity index between the encoded narration and each encoded reference topic of a plurality of encoded reference topics; comparing the similarity index between the encoded narration and each encoded reference topic to a similarity threshold; and based on the comparing, determining whether the similarity index between the encoded narration and each encoded reference topic is equal to or greater than the similarity threshold. When the similarity index is equal to or greater than the similarity threshold, a respective reference topic corresponding to the encoded reference topic associated with the similarity index is added to a result group, and, when the similarity index is less than the similarity threshold, the respective reference topic is left out of the result group. The record is classified based on a reference topic included in the result group that corresponds to the encoded reference topic associated with a greatest similarity index.

In some embodiments, the determining whether the similarity index is equal to or greater than the similarity threshold includes determining that each similarity index between the encoded narration and each encoded reference topic is less than the similarity threshold, and the computer-implemented method further includes: determining that the encoded narration corresponds to a non-matchable text narration; performing web scraping based on the non-matchable text narration, using a search application programming interface (API); based on the web scraping, obtaining contextual information corresponding to the non-matchable text narration and including keywords; inputting the contextual information into the NLP model; generating, by the NLP model, encoded contextual information based on the input contextual information; determining a similarity index between the encoded contextual information and each encoded reference topic; comparing the similarity index between the encoded contextual information and each encoded reference topic to the similarity threshold; based on the similarity index being equal to or greater than the similarity threshold, determining one or more reference topics corresponding to one or more encoded reference topics associated with the similarity index, respectively, as matching the non-matchable text narration; adding the one or more reference topics to the result group; and classifying the record corresponding to the non-matchable text narration based on a reference topic that is included in the result group and corresponds to the encoded reference topic having a greatest similarity index, among the one or more reference topics.

In some embodiments, the computer-implemented method further includes associating, in a look-up table, the non-matchable text narration, the contextual information, and the reference topic classified for the record corresponding to the non-matchable text narration.

In some embodiments, the obtaining the record includes: extracting, from the record, a narration for the record, and preprocessing the narration, to obtain a preprocessed narration, the preprocessing including at least one from among (i) removing, from the narration, at least one number, (ii) removing, from the narration, non-contextual text, (iii) removing, from the narration, at least one special character, and (iv) performing part-of-speech (POS) tagging on predetermined POS words of the narration and removing, from the narration, at least one word that is not among the predetermined POS words, where the preprocessed narration is the text narration.

In some embodiments, the computer-implemented method further includes, prior to the determining the similarity index, receiving a plurality of reference topics from a plurality of sources; preprocessing the plurality of reference topics; inputting the preprocessed plurality of reference topics into the NLP model; generating, by the NLP model, the plurality of encoded reference topics; and storing, in a database, the plurality of encoded reference topics.

In some embodiments, the record is one of a plurality of records associated with an entity, each of the plurality of records including a text narration associated therewith, the computer-implemented method further includes providing a report to a computer of the entity, the report classifying the plurality of records into reference topics corresponding to some encoded reference topics among the plurality of encoded reference topics, and each of the some encoded reference topics has a greatest similarity index within the result group corresponding to each of the plurality for records.

In some embodiments, the NLP model includes a Bidirectional Encoder Representations from Transformers (BERT) model, and the generating the encoded narration includes generating embeddings by converting the text narration into a 768-dimensional vector space.

In some embodiments, the computer-implemented method further includes, prior to the determining the similarity index, receiving a plurality of reference topics from a plurality of sources; and generating, by the NLP model, embeddings for each of the plurality of reference topics, by converting each of the plurality of reference topics into a 768-dimensional vector space, thereby generating the plurality of encoded reference topics.

In some embodiments, the determining the similarity index includes calculating a cosine similarity index as: $\cos(x, y) = x \cdot y / \|x\| * \|y\|$, where "x·y" is a product (dot) of a vector x and a vector y, $\|x\|$ is a length of the vector x, $\|y\|$ is a length of the vector y, $\|x\| * \|y\|$ is a cross-product of the vector x and the vector y, the vector x represents embeddings of the text narration, and the vector y represents embeddings of a given reference topic among the plurality of reference topics.

Some embodiments of the present disclosure include a system including one or more data processors. In some embodiments, the system includes a non-transitory computer-readable storage medium containing instructions which, when executed on the one or more data processors, cause the one or more data processors to perform part or all of one or more methods and/or part or all of one or more processes disclosed herein.

Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

Various embodiments in accordance with the present disclosure will be described with reference to the drawings, in which:

FIG. 2A depicts a flowchart illustrating processing in accordance with various embodiments.

FIG. 2D depicts a flowchart illustrating processing in accordance with various embodiments.

FIG. 3A depicts an example of the records and corresponding reference topics, in accordance with various embodiments.

FIG. 3B depicts an example of the records and corresponding reference topics, in accordance with various embodiments.

FIG. 3C depicts an example of the records and corresponding reference topics, in accordance with various embodiments.

FIG. 3D depicts an example of records of the MCC directory in accordance with various embodiments.

FIG. 3E depicts an example of the processing performed by the topic categorization system, in accordance with various embodiments.

FIG. 3F depicts an example of a partial result of the web search, in accordance with various embodiments.

FIG. 3G depicts an example of headers extracted from the result of the web search, in accordance with various embodiments.

DETAILED DESCRIPTION

Figure 1A:
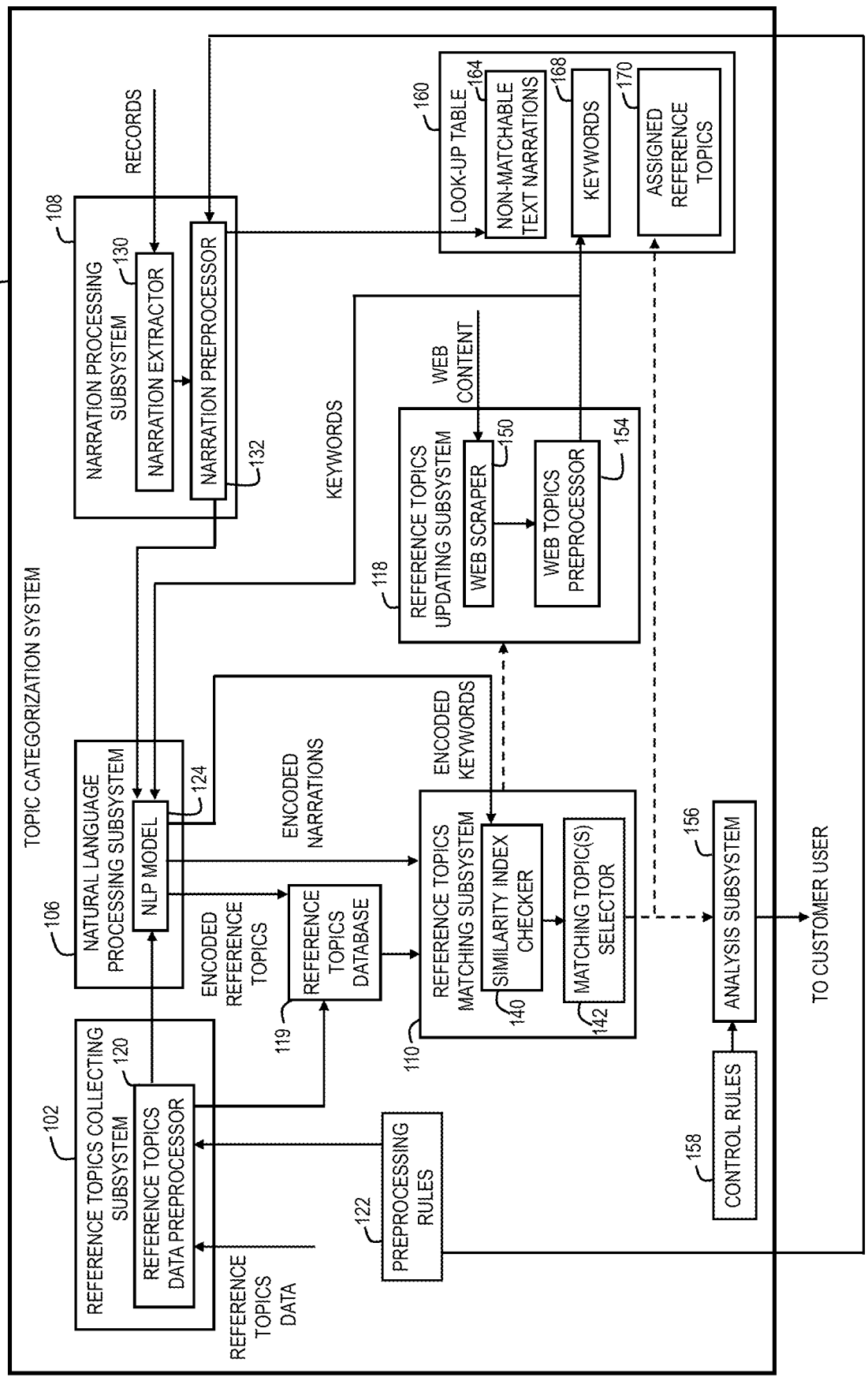
FIG. 1A depicts a block diagram of a topic categorization system in accordance with various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

The present disclosure relates generally to artificial intelligence (AI), and, more particularly, to topic categorization of records using unsupervised NLP techniques. Various embodiments are described herein, including methods, systems, non-transitory computer-readable storage media storing programs, code, or instructions executable by one or more processors, and the like.

In certain implementations, techniques described herein use a reference driven NLP-based topic categorization to efficiently make accurate determinations regarding the records' categories. Additionally, techniques described herein streamline the process of categorizing any type of the record, e.g., any type of transaction, and eliminate a problem of the related art known as the cold start when the relevant domain information corresponding to the narration of the record is unavailable.

Records, e.g., transactions, that describe corresponding topics are present in various forms, e.g., records of a personal bank account, records of a corporate account, etc. Each record may correspond to a topic or a sub-topic. The topic may be "shopping" and the sub-topic may be "clothes shopping" or "grocery shopping." For simplicity of description, topics and sub-topics are referred herein as topics or categories.

Topic categorization (or transaction categorization) is a process of classifying a record category, e.g., a transaction category. Topic categorization is performed to understand the context and purpose of a specific transaction.

Natural Language Processing is a branch of artificial intelligence that provides the computers with the ability to understand texts the same way the humans do. However, in some instances, the transactions are highly unstructured. Further, the narrations for transactions are becoming increasingly complex, they have numbers along with characters, as for example, in the narration "www.myntra.com:A 249 Bangalore". It is difficult to identify correct keywords in the narration for the transaction that can be accurately processed by the model to generate embeddings for topics matching down the line.

Further, once the keywords are extracted from the narration, on many occasions, it is difficult to find them in any contextual/domain dictionary and/or a language dictionary. For example, the contextual information of the terms "myntra" and "Bangalore" might not be present in any standard merchant codes directories or in domain-specific dictionaries. Related art transaction categorization models are not able to handle such situations.

Presently, the related art uses few approaches to solve topic categorization. One related art approach uses supervised classification, where the categories for each transaction are labeled. The labeled data is provided as an input to the untrained model that is trained using the labeled data. The trained model is capable of making predictions regarding the transaction category, date, amount, time of day, week, and type of transaction. However, this approach requires a lot of labeled datasets that is human labor intensive.

Another related art approach uses unsupervised clustering, where the vendor names in narrations are grouped, with the amount and transaction type. However, this approach is not effective because similarly named transactions are not similar if they are derived from different references.

Yet another related art approach uses rule-based (regex) method that searches for exact keywords in the narrations and matches them to the respective category. For the rule-based approach, the narration must have the same words as defined in the rules as this method dictates a fixed vocabulary, and even synonyms cannot be handled. Additionally, this approach requires many specified rules. However, it is not feasible to create all of the possible rules for the transaction categorization.

Other related art approaches utilize categorization solutions that use direct string matching and regex rules for linking narration to categories. This kind of solution is very strict to the text and word positioning, and fails whenever there is a variation in a transaction narration or a new category is introduced.

The present disclosure describes solutions that are not plagued by the above-mentioned problems. Techniques are described for simplifying the narrations and using the simplified narrations and NLP algorithms to determine the categories of records, e.g., transactions. For example, for personal accounts, the records can be classified as investment, fund transfer, salary, bill payments, grocery, entertainment, etc. For corporate accounts, the records can be classified based on the payments made, e.g., maintenance and repair, entertainment, travel, health insurance, utilities, etc. Further, budget distribution or expense distribution report can be prepared using transaction categorization. This can be used to create distribution charts to understand cash flow more effectively from the transaction statements.

In certain implementations, the described technique searches the web for the relevant meaning of the keyword, then classifies the narration based on the contextual information extracted from the web, irrespective of available domain information. This solves the cold start problem of the related that is caused by the unavailability of the relevant domain information about the narration.

In embodiments, the described technique is capable of classifying the narration into a meaningful category with the help of the reference topics, e.g., reference categories, based on the textual pattern of narration and using contextual embeddings of the words in transactional data.

The described techniques provide an end-to-end intelligent transaction categorization solution based on NLP that automatically adapts to changes and is robust in handling new category or variations in the narration text.

In certain implementations, the described techniques provide unsupervised NLP-based categorization of transaction narrations with pretrained language models.

In an embodiment, a computer-implemented method includes: obtaining a record including a text narration corresponding to context for the record; inputting the text narration into an NLP model; generating, by the NLP model, an encoded narration based on the text narration; determining a similarity index between the encoded narration and each encoded reference topic of a plurality of encoded reference topics; comparing the similarity index between the encoded narration and each encoded reference topic to a similarity threshold; and based on the comparing, determining whether the similarity index between the encoded narration and each encoded reference topic is equal to or greater than the similarity threshold. When the similarity index is equal to or greater than the similarity threshold, a corresponding reference topic is added to a result group, and, when the similarity index is less than the similarity threshold, the corresponding reference topic is left out of the result group. Then, the record is classified based on the reference topic included in the result group and corresponding to the encoded reference topic having a greatest similarity index.

Reference topics do not need to be predefined for a new category or an entity, and can be auto-collected with web scraping. When there is a narration for which no match is found in the collected reference topics (e.g., predefined MCC categories and the domain-driven set of categories), the described techniques search the Internet to gather contextual information related to the meaning of the narration. The extracted contextual information is then matched with the collected reference topics (e.g., predefined MCC categories and the domain-driven set of categories). Additionally, the gathered contextual information is associated with the narration and the matched reference topic(s) that are made available for future use. That is, if the same or similar narration is encountered again, the matched reference topic(s) can be provided without performing the Internet search, gathering of the contextual information, and detecting the matches among the reference topics. Therefore, the described techniques improve functioning of the computer, by preserving computational resources.

Further, the described techniques solve the cold start problem of the related art in the unsupervised transaction categorization use cases. As described above, performing the web scraping is conducive to determining the reference topic (e.g., a category) of a non-matchable text narration corresponding to a new merchant for which no contextual information is present in the collected reference topics. This is done with intelligent information extraction using web scraping, deriving the contextual information corresponding to the non-matchable text narration, and determining good matches of the contextual information with one or more of the collected reference topics. Therefore, the described techniques improve the technical field of software arts.

Topic Categorization System and Techniques Thereof

FIG. 1A is a block diagram of a topic categorization system 100 according to certain embodiments. The topic categorization system 100 may be implemented using one or more computer systems, each computer system having one or more processors. The topic categorization system 100 may include multiple components and subsystems communicatively coupled to each other via one or more communication mechanisms.

For example, in the embodiment depicted in FIG. 1A, the topic categorization system 100 includes a reference topics collecting subsystem 102, a natural language processing (NLP) subsystem 106, a narration processing subsystem 108, a reference topics matching subsystem 110, and a reference topics updating subsystem 118. These subsystems may be implemented as one or more computer systems. The systems, subsystems, and other components depicted in FIG. 1A may be implemented in software (e.g., code, instructions, program) executed by one or more processing units (e.g., processors, cores) of the respective systems, using hardware, or combinations thereof. The software may be stored on a non-transitory storage medium (e.g., on a memory device). Topic categorization system 100 depicted in FIG. 1A is merely an example and is not intended to unduly limit the scope of embodiments. Many variations, alternatives, and modifications are possible. For example, in some implementations, topic categorization system 100 may have more or fewer subsystems or components than those shown in FIG. 1A, may combine two or more subsystems, or may have a different configuration or arrangement of subsystems. The topic categorization system 100 and subsystems depicted in FIG. 1A may be implemented using one or more computer systems, such as the computer system depicted in FIG. 6.

The topic categorization system 100 is configured to perform multiple-phase processing using an NLP model, and output predictions involving categories of the records with high levels of accuracy.

In some implementations, the multi-phase processing performed by the topic categorization system 100 includes a training phase and a prediction phase that are performed by the reference topics collecting subsystem 102, the NLP subsystem 106, the narration processing subsystem 108, the reference topics matching subsystem 110, and the reference topics updating subsystem 118. Each of these processing phases and the functions performed by these subsystems are described below in more detail.

The reference topics collecting subsystem 102 and the NLP subsystem 106 are configured to perform processing corresponding to the training phase. The reference topics collecting subsystem 102 receives, as an input, reference topics data from the reliable sources, e.g., verified sources. The reference topics collecting subsystem 102 then performs preprocessing on the reference topics data that results in the generation of the reference topics, which are output by the reference topics collecting subsystem 102. The reference topics are then used as an input for the NLP subsystem 106. Further, the reference topics are stored in a reference topics database 119.

In certain implementations, the reference topics may be collected from a number of sources considered to be reliable, e.g., reliable sources known to those skilled in the art to provide accurate information regarding topic categorization.

As an example, the reliable source can be a predefined dictionary, e.g., a directory of standardized merchant category codes (MCCs). The MCC is a four digit number used by a credit card company to classify the business by the type of goods or services the business provides. Typically, the credit card companies assign an MCC to the business when the business begins accepting the credit card. For example, Citibank may assign four digit code xxxx to a clothes business A, where four digit code xxxx corresponds to Retail Outlet Services. As such, the category of the record corresponding to the clothes business A may be classified as "Retail Outlet Services." For example, if the record, e.g., a record of a purchase from the clothes business A, is input into the topic categorization system 100, the topic categorization system 100 may predict that the topic of the transaction record is "Retail Outlet Services."

The MCCs are described in more detail with reference to FIG. 3D.

However, the MCC directory is only well developed in the established markets. For the markets of the developing countries, e.g., India, the merchant category codes are not standardized. For these regions, the reference topics can be obtained from other reliable sources, e.g., domain-specific sources that define a fixed set of categories for that domain.

For example, the reference topics may be collected from the records of an automobile company that may define a certain set of categories for each transaction with contextual description. This methodology can be used if the number of categories is fixed and can be contextually described based on the domain knowledge of experts in the organization, contains the relevant keywords and their description (or similar words which can be used for categorization), and the category.

For example, for the automobile manufacturing unit transaction categories can be:
a. Spare parts imports
b. Marketing and advertisement
c. Full-time employee payment
d. Vendor payment
e. Transportation In certain implementations, the reference topics collecting subsystem 102 includes a reference topics data preprocessor 120. The reference topics data preprocessor 120 is configured to receive the reference topics data from the reliable sources and perform preprocessing on the reference topics data.

For example, the preprocessing performed by the reference topics data preprocessor 120 may involve several preprocessing operations performed based on preprocessing rules 122. Exemplary preprocessing operations performed by the reference topics data preprocessor 120 may include:
a) Removing numbers from the reference topics data, where the preprocessing rules 122 may have a rule specifying that, if the number is between the characters, then the number is not removed.
b) Removing stop words, where the preprocessing rules 122 may have a rule that specifies a word as a stop word, e.g., "and."

c) Removing non-contextual text, where the preprocessing rules 122 may have a rule that specifies a character string as non-contextual, e.g., "www.", ".com", etc.

d) Performing part-of-speech (POS) tagging with POS tags to extract verbs, adjectives, adverbs, and nouns. The words corresponding to the rest of the POS tags are removed. The preprocessing rules 122 may have a rule that specifies the words corresponding to helping verbs, conjunctions, and determiners as the words to be removed.

e) Removing special characters, where the preprocessing rules 122 may have a rule that specifies the special characters, e.g., @, !, #, etc.

As a result of the preprocessing performed by the reference topics data preprocessor 120, a clear and concise dictionary of reference topics is available for future use. The reference topics may be stored in the reference topics database 119.

The NLP subsystem 106 is configured to receive, as an input, the reference topics, e.g., the preprocessed reference topics data, and generate embeddings from the preprocessed reference topics data, e.g., the encoded reference topics.

The NLP subsystem 106 may include an NLP model 124 for encoding the reference topics, where the NLP model 124 is a pretrained language model that encodes the preprocessed reference topics data into N-dimensional vector spaces, where N represents the number of features used by the pretrained language model.

For example, the NLP model 124 creates embeddings based on the reference topics, where embeddings are numeric vector input that represents a word or a sentence in a lower-dimensional space considering context and word positioning. There are no limitations in using the language model, and the embeddings can be created with any language model.

In some embodiments, the NLP model 124 may be a Bidirectional Encoder Representations from Transformers (BERT) model that is a pretrained language model for creating embeddings.

BERT model is pretrained on large corpus of English literature and texts. It has contextual information on billions of English vocabulary words. Thus, BERT model may be used in text comparison, e.g., comparing two words, sentences, and paragraphs/documents having words from the large corpus of English vocabulary words.

However, in embodiments, BERT model is used for a different novel application where the standard English vocabulary words might not be available. E.g., the NLP model 124 is tasked with analyzing random texts for which there is no reference in BERT's English vocabulary. Due to the missing contextual information, it is challenging to categorize the narrations of the records. Thus, in embodiments, the novel technique uses a reference driven NLP-based transaction categorization, where the topic categorization system 100 builds on its own collected reference topics, e.g., using a BERT model.

However, this is not intended to be limiting. There are several pretrained language models that may be used as the NLP model 124 for creating embeddings. The examples of the pretrained language models include GPT-2, GPT-3, XLNet, RoBERTa, ALBERT, DistilBERT, etc. Further, in some implementations, the architecture of the NLP model 124 may be a specialized architecture to support the NLP performed by the NLP subsystem 106.

In some embodiments, the NLP model 124, which is implemented as the BERT model, converts the preprocessed reference topics data into 768-dimensional vector space, i.e., embeddings. The embeddings created by the NLP model 124 are saved in a relational database as a binary large object (BLOB). In certain implementations, the embedding created by the NLP model 124, e.g., the encoded reference topics, are saved in the reference topics database 119 in correspondence to the reference topics. However, this is not intended to be limiting. In certain implementations, the encoded reference topics and the reference topics may be stored in a different manner and/or in separate storage entities.

The narration processing subsystem 108, the NLP subsystem 106, and the reference topics matching subsystem 110 are configured to perform processing corresponding to the prediction phase.

During the processing performed at the prediction phase, the narration processing subsystem 108 receives, as an input, records, and performs processing on the records to obtain the text narrations corresponding to the records. The text narrations then are input to the NLP subsystem 106 that creates encoded narrations that serve as an input to the reference topics matching subsystem 110. The reference topics matching subsystem 110 is configured to compute a similarity index between each of the encoded narrations and the encoded reference topics, and, based on the similarity index, determine whether the reference topics database 119 stores at least one reference topic into which a particular narration can be categorized. Narrations and categorizations are described below in more detail with reference to FIGS. 3A to 3C.

As a result of the processing performed at the prediction phase, at least one reference topic that provides a good match with the narration of the record may be output.

In certain implementations, the narration processing subsystem 108 may include a narration extractor 130. The narration extractor 130 extracts the narrations from the records, e.g., from the transaction records. As an example, the narration extractor 130 may extract the narrations from the bank statement and/or the credit card statement by using a machine learning model trained to detect and extract the narrations present in the records. The extracted narrations may contain various information and symbols, e.g., system-generated identifiers (IDs), special characters, non-informative terms, etc.

Accordingly, the narration processing subsystem 108 may further include a narration preprocessor 132 configured to perform preprocessing on the narrations extracted by the narration extractor 130. For example, the preprocessing performed by the narration preprocessor 132 may be similar to the described-above preprocessing performed by the reference topics data preprocessor 120, and may involve several preprocessing operations performed based on the preprocessing rules 122 or based on a different set of rules. The goal of the preprocessing performed on the narrations that is performed by the narration preprocessor 132 is obtaining "smooth" narrations, e.g., the text narrations that can be provided to the NLP subsystem 106 for accurate encoding.

In an example, the narration extracted by the narration extractor 130 may be "www.myntra.com:A 249 Bangalore". Exemplary preprocessing operations performed by the narration preprocessor 132 on narration "www.myntra.com:A 249 Bangalore" may include:

a) Removing numbers from the narration, e.g., removing "249"

b) Removing non-contextual text, e.g., removing ".com" and "www."

c) Removing special characters, e.g., ":"

d) Performing POS tagging to extract verbs, adjectives, adverbs, and nouns, and removing the rest of the POS tags, e.g., helping verbs, conjunctions, and determiners such as "A"

In the above example, as a result of the preprocessing on the narration "www.myntra.com:A 249 Bangalore" that is performed by the narration preprocessor 132, the text narration "myntra Bangalore" is obtained and may be provided to the NLP subsystem 106.

The NLP subsystem 106 is configured to receive, as an input, the text narrations, e.g., the preprocessed narrations, and generate embeddings from the text narrations, e.g., the encoded narrations.

The NLP subsystem 106 may use the described-above NLP model 124 for encoding the text narrations, e.g., the BERT model that encodes each of the text narrations data into N-dimensional vector spaces, where N represents the number of features used by the pretrained language model. For example, the NLP model 124 creates embeddings based on each of the text narrations, where embeddings are numeric vector input that represents a word or a sentence in a lower-dimensional space considering context and word positioning. In some embodiments, the BERT model converts the processed data into 768-dimensional vector space called embeddings.

However, the described above is not intended to be limiting. In certain implementations, one NLP model, e.g., a first NLP model, may be used at the training phase, and another NLP model, e.g., a second NLP model, may be used at the prediction phase. The first NLP model and the second NLP model may be the models having the same architecture or the architecture different from each other. Various architectures of the NLP models that can be used in the embodiments are described above.

The reference topics matching subsystem 110 is configured to receive, as an input, the encoded narrations, e.g., the embeddings of the text narrations, compute a similarity index between each of the encoded narrations and the encoded reference topics, and based on the similarity index, determine whether the reference topics database 119 stores at least one reference topic into which a particular narration can be categorized. Although in embodiments the similarity index is calculated based on the encoded reference topics, the similarity index may be described herein as being associated with the reference topic since each reference topic corresponds to the respective encoded reference topic.

As described in the example above, the text narration, e.g., the preprocessed narration corresponding to the extracted narration "www.myntra.com:A 249 Bangalore" may be "myntra Bangalore". For this text narration, the embeddings are created using the NLP model 124, e.g., the encoded narration is obtained.

In certain implementations, the reference topics matching subsystem 110 includes a similarity index checker 140. The similarity index checker 140 receives one or more encoded narrations, calculates a similarity index between each of the encoded narrations and the encoded reference topics stored in the reference topics database 119, and determines a matching reference topic using the similarity index, where the matching reference topic corresponds to the encoded reference topic.

As an example, the similarity index can be calculated by the similarity index checker 140 in Python using a cosine similarity index. As known to those skilled in the relevant art, Python is a computer programming language suitable to build websites and software, automate tasks, and conduct data analysis.

In cosine similarity, data objects in a dataset are treated as a vector. The formula to find the cosine similarity between two vectors is as follows:

$$\text{Cos}(x,y) = x \cdot y / \|x\| * \|y\| \qquad \text{Equation (1)}$$

where "x·y" is a product (dot) of the vectors x and y,
$\|x\|$ a length of vector x,
$\|y\|$ is a length of vector y,
$\|x\|*\|y\|$ is a cross-product of two vectors x and y,
the vector x represents embedding(s) of the text narration, and
the vector y represents embedding(s) of a given reference topic.

Accordingly, the similarity index checker 140 calculates the similarity index for each of the encoded text narrations, and determines, for each of the encoded text narrations, whether associated similarity index is not less than a predetermined threshold, e.g., a first predetermined threshold. If for a particular reference topic, the similarity index is not less than the predetermined threshold, then the similarity index checker 140 adds that reference topic to the result group.

In certain implementations, the reference topics matching subsystem 110 may further include a matching topic(s) selector 142. The matching topic(s) selector 142 may receive, from the similarity index checker 140, one or more reference topics having the similarity index not less than the predetermined threshold, with respect to the text narration. As described above, the reference topics having the similarity index not less than the predetermined threshold with respect to the text narration form the result group. The matching topic(s) selector 142 can order the reference topics in the result group in the decreasing order, select a predetermined number of the reference topics that have the greater similarity index than other reference topics included in the result group, and output the selected reference topics. The ordering of the reference topics is described below with reference to FIG. 3E.

For example, the number of the reference topics, e.g., categories, selected by the matching topic(s) selector 142 is not more than a predetermined number defined by a user. As a non-limiting example, the predetermined number of the reference topics may be five. However, if a number of the reference topics in the result group is less than the predetermined number of the reference topics, e.g., one reference topic, the matching topic(s) selector 142 selects and outputs one reference topic.

In certain implementations, the similarity index checker 140 may determine that no similarity index associated with a particular text narration is equal to or greater than the predetermined threshold. If no similarity index associated with the particular text narration is found to be equal to or greater than the predetermined threshold, the similarity index checker 140 does not add any reference topic to the result group. Based on the processing performed by the similarity index checker 140, the reference topics matching subsystem 110 determines that no reference topic exists for the particular text narration in the reference topics database 119, e.g., no MCC or domain-driven dictionary embedding was created for the particular text narration. In this case, the particular text narration may be considered to be a non-matchable text narration corresponding to a non-matchable narration extracted by the narration extractor 130 from one of the records, and no good reference topic match exists for such narration in the reference topics database 119. Typically, this problem occurs with the transaction records corresponding to new merchants or new categories as the topic categorization system 100 is provided with only unsupervised data. It is commonly referred to as a cold start problem, as mentioned above.

If the cold start problem is encountered, the topic categorization system 100 performs the reference topics updating processing. The reference topics updating processing may be performed by the reference topics updating subsystem 118, the NLP subsystem 106, and the reference topics matching subsystem 110.

As a part of the reference topics updating processing, the reference topics updating subsystem 118 is configured to receive, as an input, the non-matchable text narration, perform the additional processing for the non-matchable text narration, and provide updates to the reference topics so that the topic categorization system 100 will find a category match for a future input of the same or similar narration.

In certain implementations, the reference topics updating subsystem 118 may include a web scraper 150 and a web topics preprocessor 154. The web scraper 150 receives, as an input, the non-matchable text narration, and searches web content to extract contextual information corresponding to the non-matchable text narration. The web scraping may be performed by searching for the web content corresponding to the non-matchable text narration using search application programming interfaces (APIs). In some embodiments, the web scraper 150 may scrape the web for knowledge using wiki search API and/or Google search API, which are search engines known to those skilled in the relevant art.

For example, the text narration "myntra Bangalore" is input to the web scraper 150 because this narration was determined to correspond to the non-matchable text narration. Based on "myntra Bangalore," the web scraper 150 can search the web using one or more search APIs, and obtain web search results as HTML documents. For example, the HTML documents correspond to top 10 uniform resource locators (URLs) returned by the search APIs that contain contextual information related to words myntra and Bangalore. The top 10 URLs show contextual information about "Myntra" pointing it to be a shopping eCommerce website, and "Bangalore" is searched as a city located in India. The web scraper 150 then may extract the H2 and/or H3 elements (headers in HTML file). The H2/H3 elements of the websites depict what the website is about and may correspond to web topics. The web scraping is described in more detail below with reference to FIGS. 3E to 3G.

The web topics preprocessor 154 preprocesses the web topics, e.g., the H2/H3 elements' contents. All the repeating words are removed. Most frequent words are given more priority. The preprocessed web topics result in the contextual information corresponding to the non-matchable text narration.

For the above exemplary narration "myntra Bangalore," the "eCommerce platform" and "Online Clothes Shopping" were some of the top results. This information may be extracted as the contextual information of the input narration.

The contextual information obtained by the web topics preprocessor 154 is combined and input into the NLP model 124 for encoding the keywords included in the contextual information. E.g., the BERT model encodes the keywords into N-dimensional vector spaces, where N represents the number of features used by the pretrained language model. For example, the NLP model 124 creates embeddings based on the keywords, e.g., creates embeddings for the contextual information, where embeddings are numeric vector input that represents a word or a sentence in a lower-dimensional space considering context and word positioning. In some embodiments, the BERT model converts the keywords into 768-dimensional vector space.

The reference topics matching subsystem 110 is configured to receive, as an input, the encoded contextual information, e.g., the embeddings of the contextual information, compute a similarity index between the encoded contextual information and each of the encoded reference topics, and, based on the similarity index, determine whether the reference topics database 119 stores at least one reference topic into which the non-matchable text narration can be categorized.

The similarity index checker 140 receives the encoded contextual information, calculates a similarity index between the encoded contextual information and the encoded reference topics stored in the reference topics database 119, and determines a matching reference topic using the similarity index.

As described above, the similarity index can be calculated by the similarity index checker 140 in Python using a cosine similarity index as described in detailed above, except that a vector used is representative of the contextual information instead of the text narration. This is because, in the reference topics updating processing, the obtained H2/H3 header keywords are encoded and used for categorization instead of the actual narrations.

The similarity index checker 140 calculates the similarity index for the encoded contextual information, and determines whether the similarity index is not less than a predetermined threshold, e.g., a second predetermined threshold. If for a particular reference topic, the similarity index is not less than the second predetermined threshold, then the similarity index checker 140 adds that reference topic to the result group. The second predetermined threshold used for the reference topics updating processing performed for the non-matchable text narrations may be the same as the first predetermined threshold or may be different.

Continuing with the above example of the non-matchable text narration "myntra Bangalore," the top categories for the embeddings are found based on the cosine similarity index between the encoded reference topics, e.g., embeddings for the MCC directory and domain-specific dictionary, and the web-scraped collected contextual information embeddings. In the above example, based on the similarity index, "Shopping" and "Men's and Women's Clothing" can be the suggested reference topics from the MCC directory that are existing reference topics stored in the reference topics database 119.

The matching topic(s) selector 142 may receive, from the similarity index checker 140, one or more reference topics having the similarity index not less than the second predetermined threshold, with respect to the contextual information, e.g., the encoded contextual information. As described above, the matching topic(s) selector 142 can order the reference topics in the result group in the decreasing order, select a number of the reference topics having the greater similarity index than other reference topics included in the result group, and output the selected reference topics. The ordering of the reference topics is described below with reference to FIG. 3E.

For example, the number of the reference topics, e.g., categories, selected by the matching topic(s) selector 142 is not more than a predetermined number defined by a user. As a non-limiting example, the predetermined number of the reference topics may be five. However, if a number of the reference topics in the result group is less than the predetermined number of the reference topics, e.g., one reference topic, the matching topic(s) selector 142 selects and outputs one reference topic.

In certain implementations, the topic categorization system 100 may further include an analysis subsystem 156. The analysis subsystem 156 is configured to receive the predetermined number of the ordered reference topics received from the matching topic(s) selector 142, analyze the ordered reference topics based on additional contextual information and/or and control rules 158, and output one or all of the reference topics received from the matching topic(s) selector 142, to be used by the user, e.g., a customer user. For example, the control rules 158 can have a rule to output the reference topic having a greatest similarity index with respect to the text narration among the reference topics received from the matching topic(s) selector 142, as a category of the record.

The categorized records, e.g. the transaction records, may be used by users or customers in different ways. As an example, users may be able to better manage their finances. The organizations may use the categorized transactions in decision-making, targeted advertising, and planning processes. For example, the organization may use the predicted categorizations of transactions for promotions, personalized messaging, alerts, servicing, etc.

In certain implementations, the topic categorization system 100 includes a look-up table 160. As a result of the reference topics updating processing, the look-up table 160 can store non-matchable text narrations 164, keywords 168 of the contextual information, and assigned reference topics 170 that are the reference topics determined to correspond to the non-matchable text narrations. The look-up table 160 can associate each of non-matchable text narrations 164 with their corresponding contextual information and the reference topic determined to correspond to the non-matchable text narration. If, in the future, the same narration is encountered again and cannot be matched to any reference topic from the reference topics database 119, it could be classified by searching the look-up table 160 without performing the reference topics updating processing. This improves the functioning of the computer by reducing computational resources. Further, it solves the cold start problem of the related art methods.

However, this is not intended to be limiting. In some embodiments, a new domain-specific category may be processed and stored in the reference topics database 119 using the same contextual information as the description of the category.

Figure 1B:
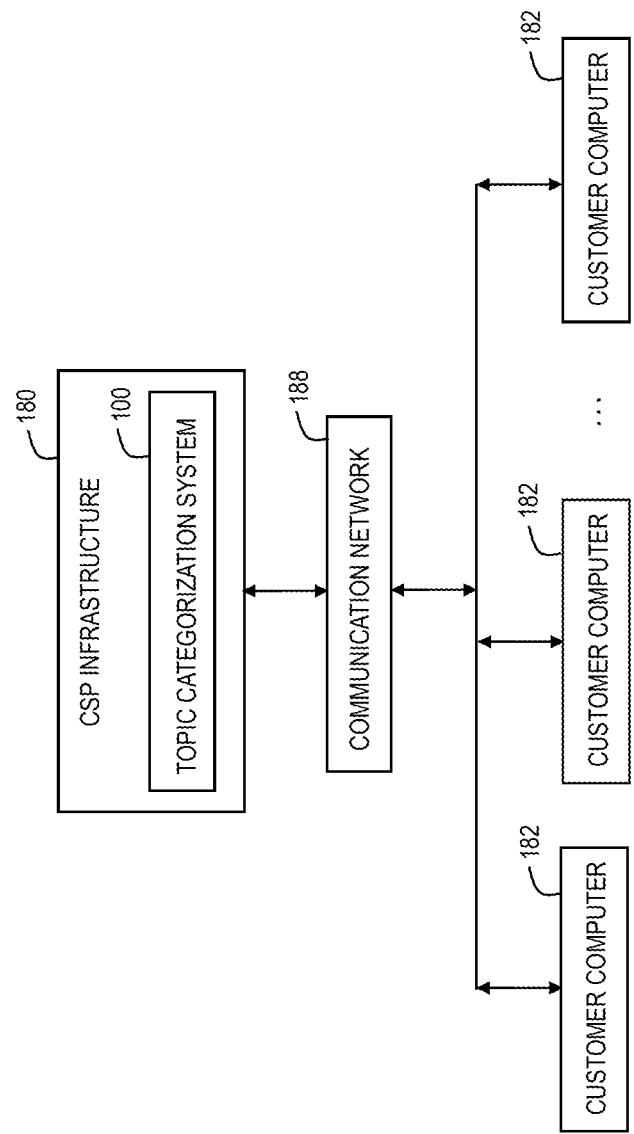
FIG. 1B is a block diagram of a topic categorization system in a cloud service provider (CSP) infrastructure according to an embodiment.
Figure 5:
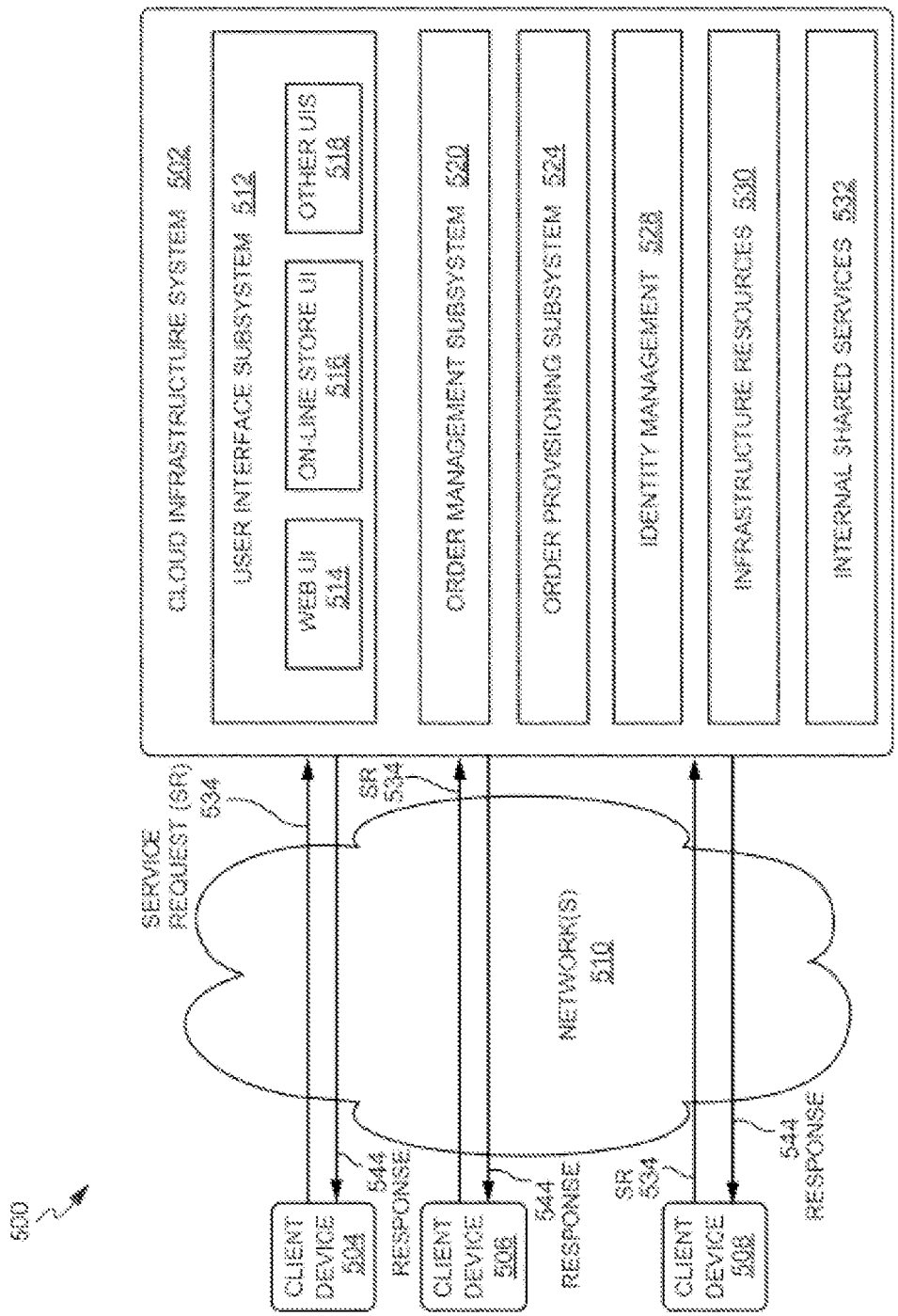
FIG. 5 is a simplified block diagram of one or more components of a system environment by which services provided by one or more components of an embodiment system may be offered as cloud services, in accordance with various embodiments.

As shown in FIG. 1B, the topic categorization system 100 may be a part of a CSP infrastructure 180 provided by a CSP for providing one or more cloud services to one or more customer computers 182. Example of a cloud infrastructure architecture provided by the CSP is depicted in FIG. 5 and described in detail below.

Figure 1C:
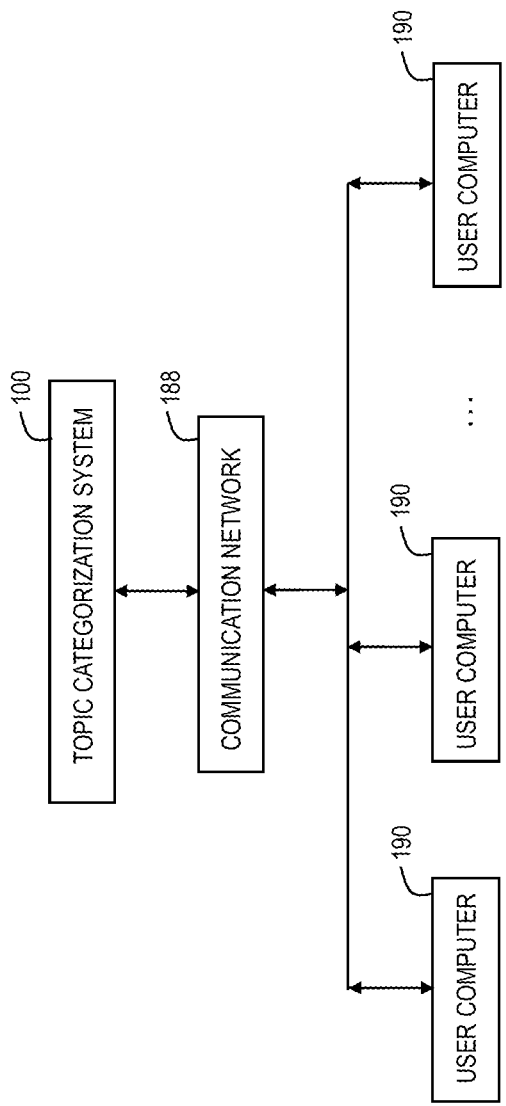
FIG. 1C is a simplified block diagram of a topic categorization system in a distributed computing environment according to an embodiment.
Figure 4:
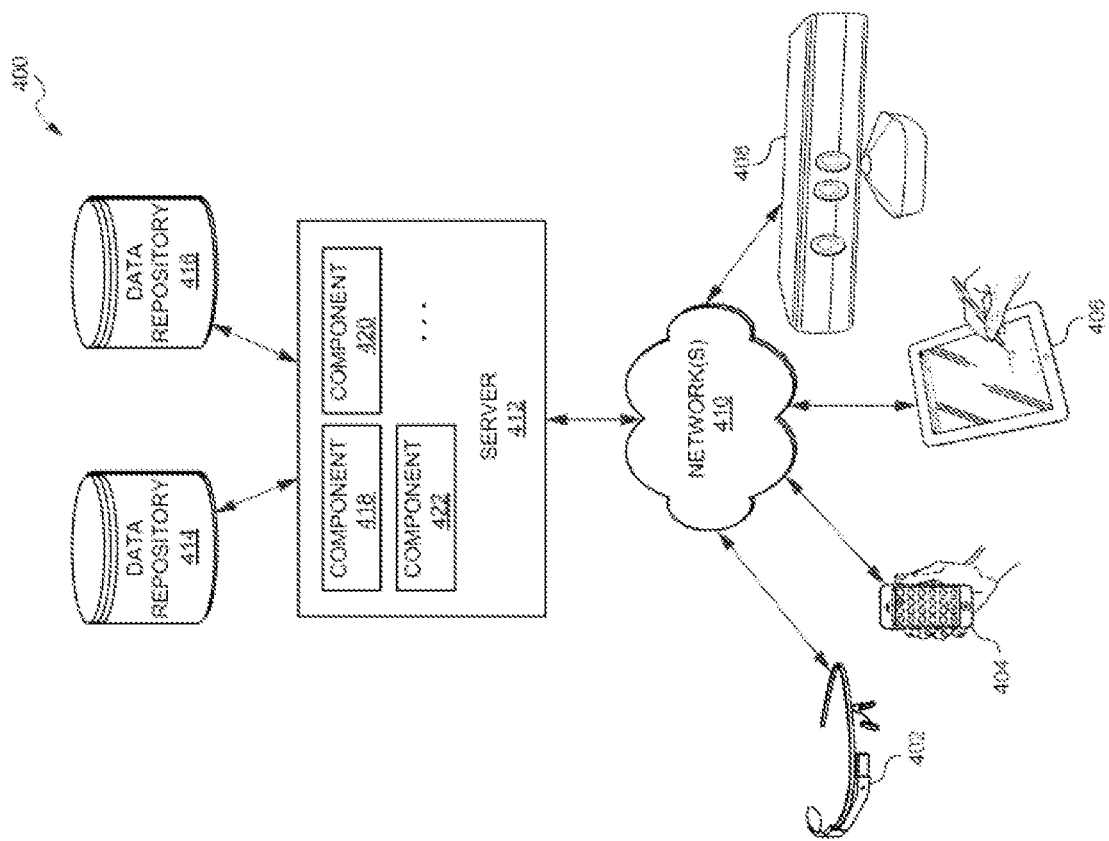
FIG. 4 depicts a simplified diagram of a distributed system for implementing various embodiments.

As shown in FIG. 1C, the topic categorization system 100 can be provided as a part of a distributed computing environment, where the topic categorization system 100 is connected to one or more user computers 190 via a communication network 188. Example of a distributed computing environment is depicted in FIG. 4 and described in detail below.

FIG. 2A depicts a simplified flowchart depicting processing 200 performed by the topic categorization system 100, according to certain embodiments. For example, the processing 200 depicted in FIG. 2A may be performed by the reference topics collecting subsystem 102 and the NLP subsystem 106 at the training phase.

The processing 200 depicted in FIG. 2A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2A and described below is intended to be illustrative and non-limiting. Although FIG. 2A depicts the various processing operations occurring in a particular sequence or order, this is not intended to be limiting. In certain alternative embodiments, the processing 200 may be performed in some different order or some operations may be performed in parallel.

With continuing reference to FIG. 2A and referring again to FIG. 1A, at 202, the reference topics collecting subsystem 102 may obtain reference topics data from the reliable sources, e.g., a predefined dictionary or domain-specific sources.

At 204, the reference topics collecting subsystem 102 may preprocess the reference topics data.

At 206, the reference topics collecting subsystem 102 may provide, as an input, the preprocessed reference topics to the pretrained language model, e.g., to the NLP model 124 of the NLP sub system 106.

At 208, the NLP subsystem 106 may obtain the encoded reference topics.

At 210, the encoded reference topics may be stored in the reference topics database 119 in correspondence to the reference topics.

Figure 2B:
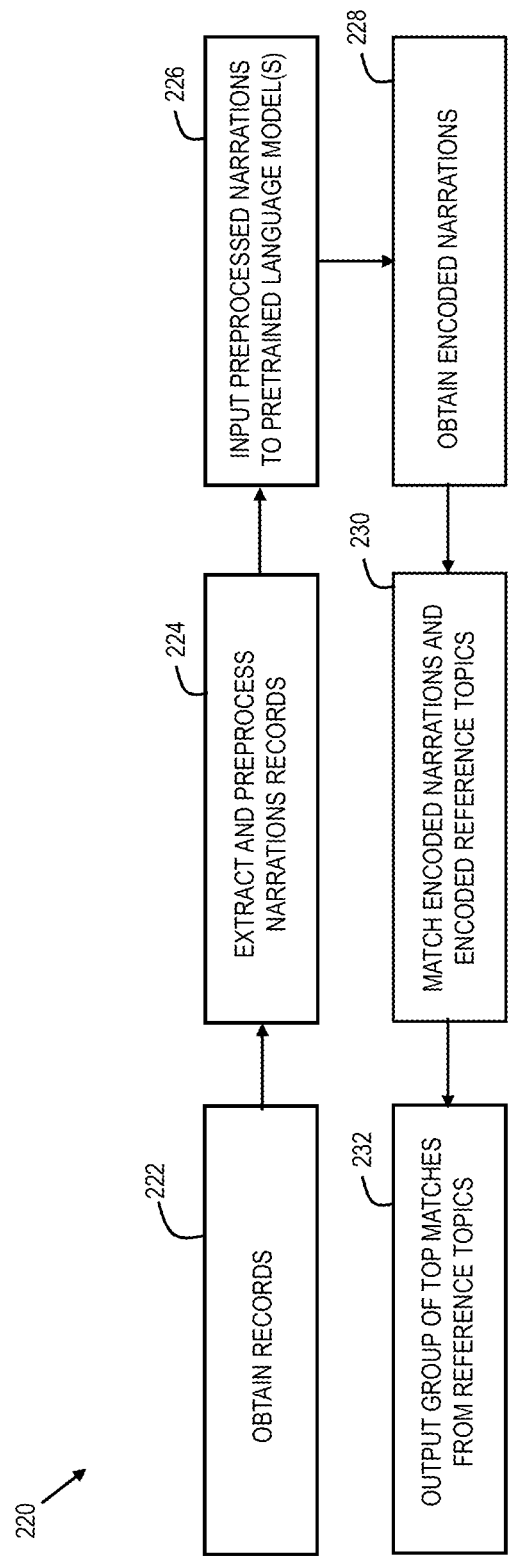
FIG. 2B depicts a flowchart illustrating processing in accordance with various embodiments.

FIG. 2B depicts a simplified flowchart depicting processing 220 performed by the topic categorization system 100 at least partially subsequently to the processing 200, according to certain embodiments. For example, the processing 220 depicted in FIG. 2B may be performed by the narration processing subsystem 108, the NLP subsystem 106, and the reference topics matching subsystem 110 at the prediction phase.

The processing 220 depicted in FIG. 2B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2B and described below is intended to be illustrative and non-limiting. Although FIG. 2B depicts the various processing operations occurring in a particular sequence or order, this is not intended to be limiting. In certain alternative embodiments, the processing 220 may be performed in some different order or some operations may be performed in parallel.

With continuing reference to FIG. 2B and referring again to FIG. 1A, at 222, the narration processing subsystem 108 may obtain records. For example, the records may be transaction records obtained from the bank statements and/or credit card statements.

At 224, the narration processing subsystem 108 may extract the narrations from the records and preprocess extracted narrations.

At 226, the narration processing subsystem 108 may provide, as an input, the preprocessed narrations, e.g., the text narrations, to the NLP model 124 of the NLP subsystem 106.

At 228, the NLP subsystem 106 may obtain the encoded narrations.

At 230, the reference topics matching subsystem 110 may match the encoded narrations and the encoded reference topics stored in the reference topics database 119.

At 232, the reference topics matching subsystem 110 may output a group of top matches determined from the reference topics included in the result group.

Figure 2C:
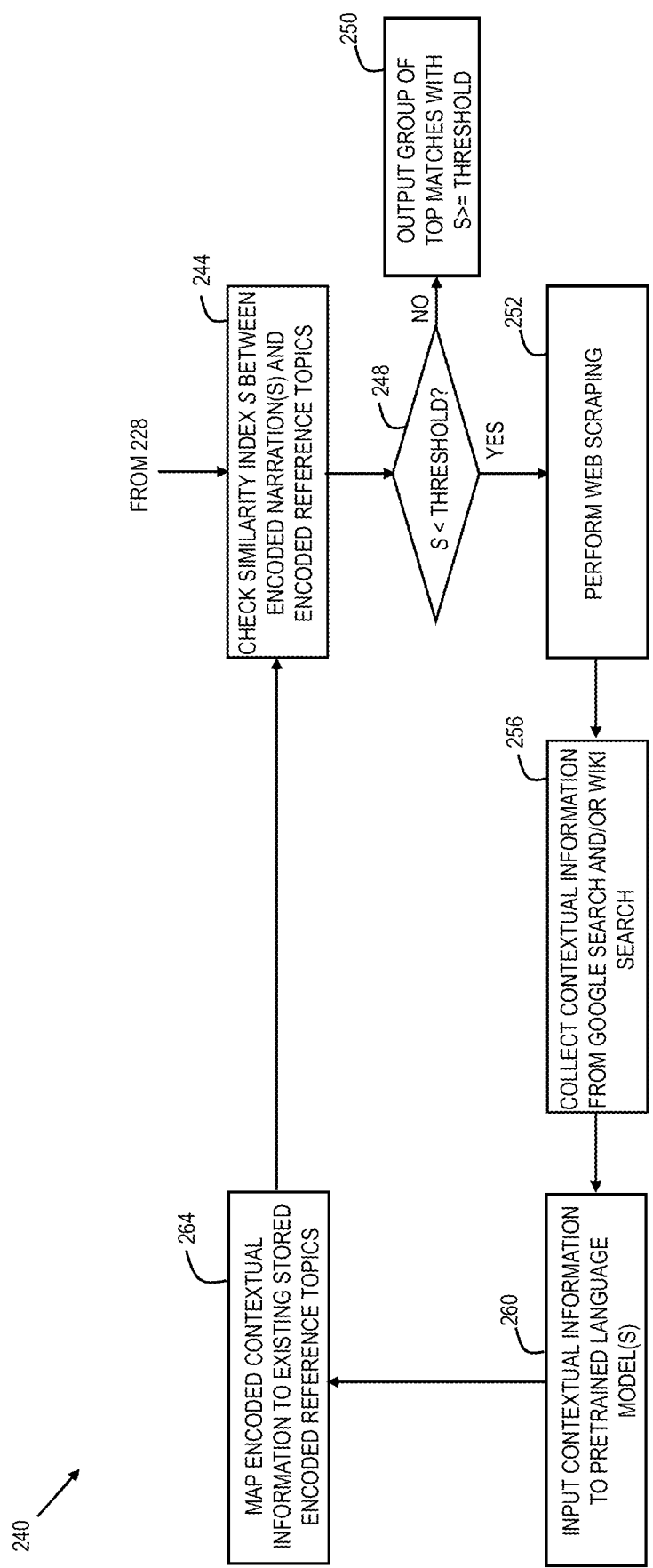
FIG. 2C depicts a flowchart illustrating processing in accordance with various embodiments.

FIG. 2C depicts a simplified flowchart depicting a processing 240 performed by the topic categorization system 100, according to certain embodiments. For example, the processing 240 depicted in FIG. 2C corresponds to operation 230 of FIG. 2B and may be performed by the reference topics updating subsystem 118, the NLP subsystem 106, and the reference topics matching subsystem 110 as a part of the prediction phase.

The processing 240 that is depicted in FIG. 2C may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2C and described below is intended to be illustrative and non-limiting. Although FIG. 2C depicts the various processing operations occurring in a particular sequence or order, this is not intended to be limiting. In certain alternative embodiments, the processing 240 that may be performed in some different order or some operations may be performed in parallel.

With continuing reference to FIG. 2C and referring again to FIG. 1A, at 244, the reference topics matching subsystem 110 may check the similarity index between encoded narration and the encoded reference topics against a predetermined threshold.

At 248, if it is determined that the similarity index is not less than the predetermined threshold, the processing 240 proceeds to operation 250.

At 250, the reference topics matching subsystem 110 outputs the group of top matches determined from the reference topics included in the result group.

However, if, at 248, if it is determined that the similarity index is less than the predetermined threshold, e.g., it is determined that a non-matchable text narration is being processed, the processing 240 proceeds to operation 252.

At 252, the reference topics updating subsystem 118 performs the web scraping corresponding to the non-matchable text narration.

At 256, the reference topics updating subsystem 118 collects contextual information corresponding to the non-matchable text narration using the results of the Google search and/or wiki search, as described above.

At 260, the reference topics updating subsystem 118 provides, as an input, the contextual information to the pretrained language model, e.g., the NLP model 124 of the NLP sub system 106.

At 264, the reference topics matching subsystem 110 maps the encoded contextual information received from the NLP subsystem 106 to existing encoded reference topics stored in the reference topics database 119, to determine good matches between the existing reference topics and the contextual information for the non-matchable text narration.

The processing 240 then proceeds to the operation 244.

FIG. 2D depicts a simplified flowchart depicting processing 270 performed by the topic categorization system 100, according to certain embodiments. For example, the processing 270 depicted in FIG. 2D may be performed by the narration processing subsystem 108, the reference topics matching sub system 110, and the analysis sub system 156.

The processing 270 depicted in FIG. 2D may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 2D and described below is intended to be illustrative and non-limiting. Although FIG. 2D depicts the various processing operations occurring in a particular sequence or order, this is not intended to be limiting. In certain alternative embodiments, the processing 270 may be performed in some different order or some operations may be performed in parallel.

With continuing reference to FIG. 2D and referring again to FIG. 1A, at 272, the narration processing subsystem 108 may obtain a record including text narration corresponding to context for the record.

The record may undergo processing to obtain the text narration that may include extracting, from the record, a narration for the record, and preprocessing the narration, the preprocessing including at least one from among (i) removing, from the narration, at least one number, (ii) removing, from the narration, non-contextual text, (iii) removing, from the narration, at least one special character, and (iv) performing part-of-speech (POS) tagging on predetermined POS words of the narration and removing, from the narration, at least one word that is not among the predetermined POS words.

At 274, the narration processing subsystem 108 may provide, as an input, the text narrations, to the NLP model 124 of the NLP subsystem 106.

Operations 272 and 274 may correspond to all or some of operations 222, 224, and 226 of FIG. 2B.

At 276, the NLP model 124 of the NLP subsystem 106 may generate an encoded narration based on the text narration. Operation 276 may correspond operation 228 of FIG. 2B.

At 278, the reference topics matching subsystem 110 may determine a similarity index between the encoded narration and each encoded reference topic of a plurality of encoded reference topics stored in the reference topics database 119.

For example, the plurality of reference topics are received from a plurality of sources, and then preprocessed. The preprocessed plurality of reference topics is input into the NLP model 124 that generates the plurality of encoded reference topics. The plurality of encoded reference topics is the stored in the reference topics database 119.

At 280, the reference topics matching subsystem 110 may compare the similarity index between the encoded narration and each encoded reference topic to a similarity threshold.

At 282, the reference topics matching subsystem 110 may determine whether the similarity index between the encoded narration and each encoded reference topic is equal to or greater than the similarity threshold.

If, at 282, it is determined that the similarity index is equal to or greater than the similarity threshold, a corresponding reference topic is added to a result group (operation 284). Further, at 286, the analysis subsystem 156 may select one of the reference topics from the result group that has a greatest similarity index, and classify the record based on the selected reference topic.

Operations 278 to 286 may correspond at least partially to all or some of operations 244, 248, and 250 of FIG. 2C.

If, at 282, it is determined that the similarity index is less than the similarity threshold, the corresponding reference topic is left out of the result group (operation 288).

Further, if it is determined that the similarity index is less than the similarity threshold, it is determined that the encoded narration corresponds to a non-matchable text narration; a web scraping is performed based on the non-matchable text narration, using a search API; based on the web scraping, contextual information corresponding to the non-matchable text narration is obtained, contextual information including keywords; the contextual information is input into the NLP model 124 that generates encoded contextual information based on the input contextual information; a similarity index between the encoded contextual information and each encoded reference topic is determined; the similarity index between the encoded contextual information and each encoded reference topic is compared to the similarity threshold; based on the similarity index being equal to or greater than the similarity threshold, one or more reference topics corresponding to one or more encoded reference topics associated with the similarity index, respectively, are determined as matching the non-matchable text narration; the one or more reference topics are added to the result group; and the record corresponding to the non-matchable text narration is classified based on a reference topic that is included in the result group and corresponds to the encoded reference topic having a greatest similarity index, among the one or more reference topics.

Additionally, the non-matchable text narration, the contextual information, and the reference topic classified for the record corresponding to the non-matchable text narration are associated in the look-up table 160.

The record may be one of a plurality of records associated with an entity, where each of the plurality of records includes a text narration associated therewith. Upon classifying each of the plurality of records into a corresponding reference topic, a report may be provided to a computer of the entity, showing categorization of the plurality of records into the reference topics. The reference topics in the report may correspond corresponding to some encoded reference topics among the plurality of encoded reference topics, and each of the some encoded reference topics has a greatest similarity index within the result group corresponding to each of the plurality for records.

FIG. 3A depicts an example of records 300 and corresponding reference topics, e.g., predicted categories 301, which may be predicted by the topic categorization system 100, in accordance with various embodiments.

In some instances, the topic categorization system 100 can be used in banking transactions to (1) simplify the collected transactions, provide clean insights, and lead to better data analysis, and (2) better understand the spending patterns of the customer or the user and accordingly make wiser business decisions. However, this is not intended to be limiting. The topic categorization system 100 can be used in banking transactions for different applications or may be used for a different industry.

As shown in FIG. 3A, the records 300 may be a portion of the transaction records of a personal credit card statement. Each of the records 300 includes a date, a narration, and an amount. As an example, a first record 302 includes a date "14-03-22," a narration "GOOGLE *GOOGLE STORAGEA 888-888-3333," and an amount "Rs. 400.00."

Based on the processing performed by the topic categorization system 100, the predicted category for the narration "GOOGLE*GOOGLE STORAGEA 888-888-3333" is "utility," as depicted in FIG. 3A.

FIG. 3B depicts an example of records 310 and corresponding reference topics, e.g., predicted categories 312, which may be predicted by the topic categorization system 100, in accordance with various embodiments.

In certain implementations, the topic categorization system 100 can be used in corporate banking, to simplify fund management among corporate bank accounts, improve the performance of business analysts by providing the classified transactions, and/or enhance the tracking of cash inflows and outflows. However, this is not intended to be limiting. The topic categorization system 100 can be used in corporate banking for different applications or may be used for a different industry.

As shown in FIG. 3B, the records 310 may be a portion of the transaction records of a corporate credit card statement. Each of the records 310 includes a date, a narration, and an amount. As an example, a first record 314 includes a date "5 Jul. 17," a narration "TRF FROM Indiaforensic SERVICES," and an amount "Rs. 1,000,000.00."

Based on the processing performed by the topic categorization system 100, the predicted category for the narration "TRF FROM Indiaforensic SERVICES" is "fund transfer," as depicted in FIG. 3B.

FIG. 3C depicts an example of records 320 and corresponding reference topics, e.g., predicted categories 322, which may be predicted by the topic categorization system 100, in accordance with various embodiments.

In certain implementations, the topic categorization system 100 can be used for various data categorization, e.g., expense report preparation, reconciliation, cash inflow, etc.

As depicted in FIG. 3C, the records 320 may be a portion of the store grocery bill. Each of the records 320 includes a grocery item name, e.g., a narration and an amount. As an example, a first record 324 includes a narration "Parle G," and an amount "80." Based on the processing performed by the topic categorization system 100, the predicted category for the narration "Parle G" is "Biscuits," as depicted in FIG. 3C.

The topic categorization system 100 can help the store to identify the amount generated in each category. There may be instances where some new products such as "Top ramen" might not be present in the store dictionary. However, "Top ramen" can be classified by the topic categorization system 100 using a web search to find relevant contextual information about this product to identify the accurate category, e.g., "Instant noodles," according to the techniques described above.

FIG. 3D depicts an example of records 330 of the MCC directory, in accordance with various embodiments.

As depicted in FIG. 3D, each of the records 330 includes an MCC code and associated merchant category. As an example, a first record 334 includes an MCC code 0742 and associated merchant category "Veterinary Services." As described above, "Veterinary Services" may be one of the reference topics stored in the reference topics database 119.

FIG. 3E depicts an example of the processing performed by the topic categorization system 100 on a record input to the topic categorization system 100, in accordance with various embodiments. Similarly to what is described above, the narration extractor 130 may process the record and extract, from the record, a narration 342, "MANGO TREE HOSPITALITY BANGALORE." The narration preprocessor 132 may preprocess the narration 342 to obtain a text narration 344, "MANGO TREE HOSPITALITY BANGALORE." In this example, the narration 342 is the same as the text narration 344, as a non-limiting example. After the reference topics matching subsystem 110 determines that there is no good matching reference topic in the reference topics database 119, the web scraper 150 initiates web scraping using a search API based on "MANGO TREE HOSPITALITY BANGALORE." The web scraper 150 then may extract the H2 and/or H3 elements.

Figure 3F:
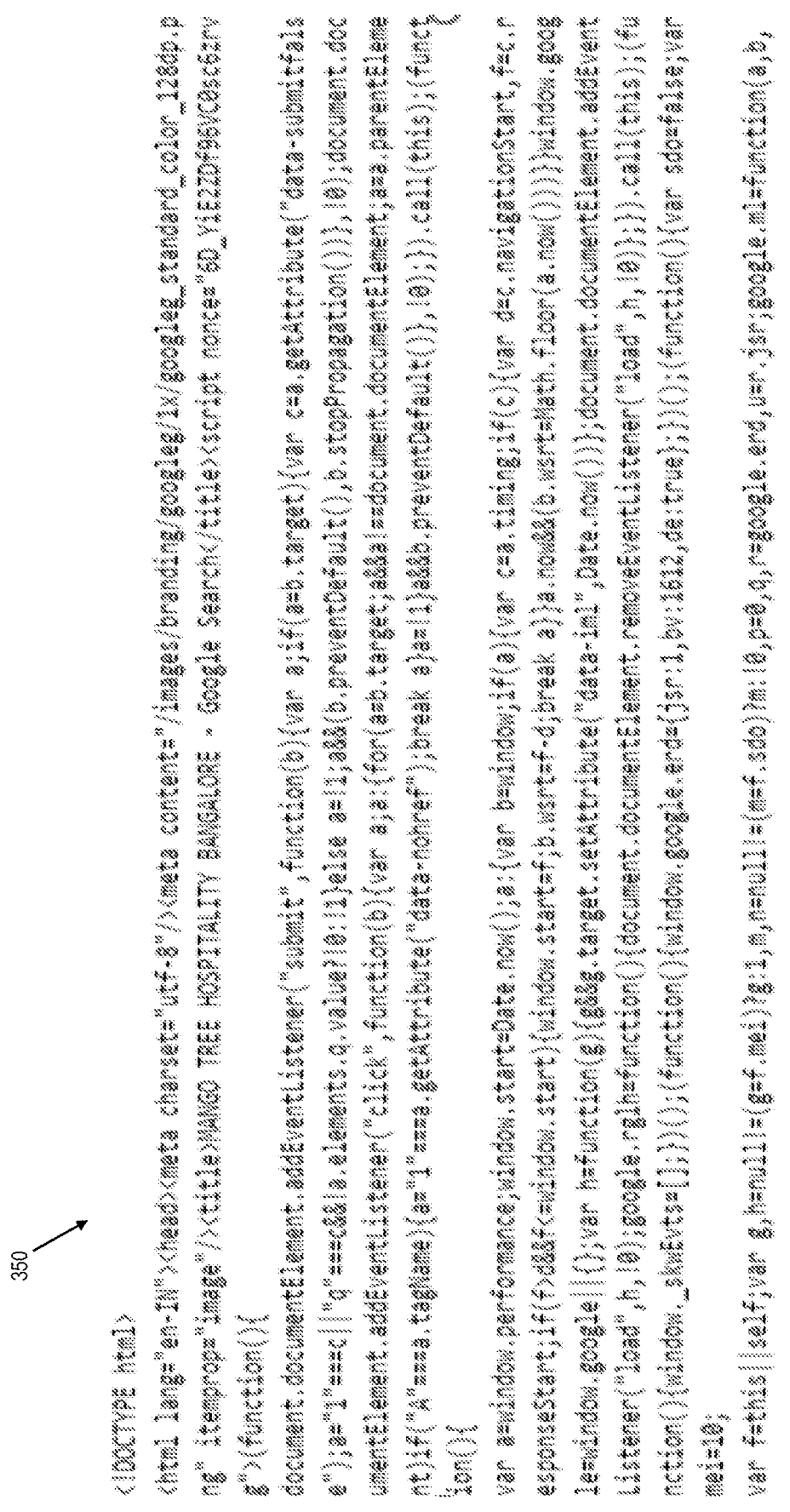

FIG. 3F depicts a partial result (reference numeral 350) of the web search results obtained using the search API by the web scraper 150, in accordance with various embodiments.

FIG. 3G depicts headers 360 extracted by the web scraper 150 from the result of the web search, in accordance with various embodiments.

As described above, the web topics preprocessor 154 preprocesses the web topics, e.g., the descriptions in the headers that describe the websites. As a result of the web scraping described above, the web topics preprocessor 154 may determine contextual information, e.g., keywords, from the headers. For example, the contextual information extracted from the headers 360 of FIG. 3G may be "Sai Mango Tree Hotels Zomato Bangalore Purple Brigade Hospitality Cuisine."

As a result of the processing performed by the NLP subsystem 106 and the reference topics matching subsystem 110 that are described above, the top reference topics for the contextual information "Sai Mango Tree Hotels Zomato Bangalore Purple Brigade Hospitality Cuisine" are "Hotels" with a similarity index 0.91 (reference numeral 346) and "Resorts" with a similarity index 0.8 (reference numeral 348), as depicted in FIG. 3D. As illustrated, the top reference topics are ordered in a decreasing order.

Illustrative Systems

FIG. 4 depicts a simplified diagram of a distributed system 400. In the illustrated example, distributed system 400 includes one or more client computing devices 402, 404, 406, and 408, coupled to a server 412 via one or more communication networks 410. Client computing devices 402, 404, 406, and 408 may be configured to execute one or more applications. In certain implementations, the topic categorization system 100 may reside at the server 412.

In various examples, server 412 may be adapted to run one or more services or software applications that enable one or more embodiments described in this disclosure. In certain examples, server 412 may also provide other services or software applications that may include non-virtual and virtual environments. In some examples, these services may be offered as web-based or cloud services, such as under a Software as a Service (SaaS) model to the users of client computing devices 402, 404, 406, and/or 408. Users operating client computing devices 402, 404, 406, and/or 408 may in turn utilize one or more client applications to interact with server 412 to utilize the services provided by these components.

In the configuration depicted in FIG. 4, server 412 may include one or more components 418, 420 and 422 that implement the functions performed by server 412. These components may include software components that may be executed by one or more processors, hardware components, or combinations thereof. It should be appreciated that various different system configurations are possible, which may be different from distributed system 400. The example shown in FIG. 4 is thus one example of a distributed system for implementing an example system and is not intended to be limiting.

Users may use client computing devices 402, 404, 406, and/or 408 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 4 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 410 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 410 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 412 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 412 may include one or more virtual machines running virtual operating systems, or other computing architectures involving virtualization such as one or more flexible pools of logical storage devices that may be virtualized to maintain virtual storage devices for the server. In various examples, server 412 may be adapted to run one or more services or software applications that provide the functionality described in the foregoing disclosure.

The computing systems in server 412 may run one or more operating systems including any of those discussed above, as well as any commercially available server operating system. Server 412 may also run any of a variety of additional server applications and/or mid-tier applications, including HTTP (hypertext transport protocol) servers, FTP (file transfer protocol) servers, CGI (common gateway interface) servers, JAVA ° servers, database servers, and the like. Exemplary database servers include without limitation those commercially available from Oracle®, Microsoft®, Sybase®, IBM® (International Business Machines), and the like.

In some implementations, server 412 may include one or more applications to analyze and consolidate data feeds and/or event updates received from users of client computing devices 402, 404, 406, and 408. As an example, data feeds and/or event updates may include, but are not limited to, Twitter® feeds, Facebook ° updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 412 may also include one or more applications to display the data feeds and/or real-time events via one or more display devices of client computing devices 402, 404, 406, and 408.

Distributed system 400 may also include one or more data repositories 414, 416. These data repositories may be used to store data and other information in certain examples. For example, one or more of the data repositories 414, 416 may be used to store information such as information related to machine-learning model performance or generated machine-learning model for use by server 412 when performing various functions in accordance with various embodiments. Data repositories 414, 416 may reside in a variety of locations. For example, a data repository used by server 412 may be local to server 412 or may be remote from server 412 and in communication with server 412 via a network-based or dedicated connection. Data repositories 414, 416 may be of different types. In certain examples, a data repository used by server 412 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 414, 416 may also be used by applications to store application data. The data repositories used by applications may be of different types such as, for example, a key-value store repository, an object store repository, or a general storage repository supported by a file system.

In certain examples, the functionalities described in this disclosure may be offered as services via a cloud environment. FIG. 5 is a simplified block diagram of a cloud-based system environment 500 in which various services may be offered as cloud services in accordance with certain examples. In the example depicted in FIG. 5, cloud infrastructure system 502 may provide one or more cloud services that may be requested by users using one or more client computing devices 504, 506, and 508. Cloud infrastructure system 502 may include one or more computers and/or servers that may include those described above for server 412. The computers in cloud infrastructure system 502 may be organized as general purpose computers, specialized server computers, server farms, server clusters, or any other appropriate arrangement and/or combination.

Network(s) 510 may facilitate communication and exchange of data between clients 504, 506, and 508 and cloud infrastructure system 502. Network(s) 510 may include one or more networks. The networks may be of the same or different types. Network(s) 510 may support one or more communication protocols, including wired and/or wireless protocols, for facilitating the communications.

The example depicted in FIG. 5 is only one example of a cloud infrastructure system and is not intended to be limiting. It should be appreciated that, in some other examples, cloud infrastructure system 502 may have more or fewer components than those depicted in FIG. 5, may combine two or more components, or may have a different configuration or arrangement of components. For example, although FIG. 5 depicts three client computing devices, any number of client computing devices may be supported in alternative examples.

The term cloud service is generally used to refer to a service that is made available to users on demand and via a communication network such as the Internet by systems (e.g., cloud infrastructure system 502) of a service provider. Typically, in a public cloud environment, servers and systems that make up the cloud service provider's system are different from the customer's own on-premises servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 502 may provide one or more cloud services using different models such as under a Software as a Service (SaaS) model, a Platform as a Service (PaaS) model, an Infrastructure as a Service (IaaS) model, and others, including hybrid service models. Cloud infrastructure system 502 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 502. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 502. Cloud infrastructure system 502 then performs processing to provide the services requested in the customer's subscription order. For example, a user may use utterances to request the cloud infrastructure system to take a certain action (e.g., an intent), as described above, and/or provide services for a topic categorization system as described herein. Cloud infrastructure system 502 may be configured to provide one or even multiple cloud services.

Cloud infrastructure system 502 may provide the cloud services via different deployment models. In a public cloud model, cloud infrastructure system 502 may be owned by a third party cloud services provider and the cloud services are offered to any general public customer, where the customer may be an individual or an enterprise. In certain other examples, under a private cloud model, cloud infrastructure system 502 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 502 and the services provided may be shared by several organizations in a related community. Various other models such as hybrids of the above mentioned models may also be used.

Client computing devices 504, 506, and 508 may be of different types (such as client computing devices 402, 404, 406, and 408 depicted in FIG. 4) and may be capable of operating one or more client applications. A user may use a client device to interact with cloud infrastructure system 502, such as to request a service provided by cloud infrastructure system 502. For example, a user may use a client device to request information or action from a topic categorization system as described in this disclosure, or from another system.

In some examples, the processing performed by cloud infrastructure system 502 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 502 for generating and training one or more models for a machine-learning recommendation system. The data used for this analysis may include structured data (e.g., data stored in a database or structured according to a structured model) and/or unstructured data (e.g., data blobs (binary large objects)).

As depicted in the example in FIG. 5, cloud infrastructure system 502 may include infrastructure resources 530 that are utilized for facilitating the provision of various cloud services offered by cloud infrastructure system 502. Infrastructure resources 530 may include, for example, processing resources, storage or memory resources, networking resources, and the like. In certain examples, the storage virtual machines that are available for servicing storage requested from applications may be part of cloud infrastructure system 502. In other examples, the storage virtual machines may be part of different systems.

In certain examples, to facilitate efficient provisioning of these resources for supporting the various cloud services provided by cloud infrastructure system 502 for different customers, the resources may be bundled into sets of resources or resource modules (also referred to as "pods"). Each resource module or pod may include a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 502 may itself internally use services 532 that are shared by different components of cloud infrastructure system 502 and which facilitate the provisioning of services by cloud infrastructure system 502. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

Cloud infrastructure system 502 may include multiple subsystems. These subsystems may be implemented in software, or hardware, or combinations thereof. As depicted in FIG. 5, the subsystems may include a user interface subsystem 512 that enables users or customers of cloud infrastructure system 502 to interact with cloud infrastructure system 502. User interface subsystem 512 may include various different interfaces such as a web interface 514, an online store interface 516 where cloud services provided by cloud infrastructure system 502 are advertised and are purchasable by a consumer, and other interfaces 518. For example, a customer may, using a client device, request (service request 534) one or more services provided by cloud infrastructure system 502 using one or more of interfaces 514, 516, and 518. For example, a customer may access the online store, browse cloud services offered by cloud infrastructure system 502, and place a subscription order for one or more services offered by cloud infrastructure system 502 that the customer wishes to subscribe to. The service request may include information identifying the customer and one or more services that the customer desires to subscribe to. For example, a customer may place a subscription order for a service offered by cloud infrastructure system 502. As part of the order, the customer may provide information identifying a machine-learning recommendation system for which the service is to be provided and optionally one or more credentials for the machine-learning recommendation system.

In certain examples, such as the example depicted in FIG. 5, cloud infrastructure system 502 may include an order management subsystem (OMS) 520 that is configured to process the new order. As part of this processing, OMS 520 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 520 may then invoke the order provisioning subsystem (OPS) 524 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 524 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 502 as part of the provisioning process. Cloud infrastructure system 502 may generate an application ID and select a storage virtual machine for an application from among storage virtual machines provided by cloud infrastructure system 502 itself or from storage virtual machines provided by other systems other than cloud infrastructure system 502.

Cloud infrastructure system 502 may send a response or notification 544 to the requesting customer to indicate when the requested service is now ready for use. In some instances, information (e.g., a link) may be sent to the customer that enables the customer to start using and availing the benefits of the requested services. In certain examples, for a customer requesting the service, the response may include a machine-learning recommendation system ID generated by cloud infrastructure system 502 and information identifying a machine-learning recommendation system selected by cloud infrastructure system 502 for the machine-learning recommendation system corresponding to the machine-learning recommendation system ID.

Cloud infrastructure system 502 may provide services to multiple customers. For each customer, cloud infrastructure system 502 is responsible for managing information related to one or more subscription orders received from the customer, maintaining customer data related to the orders, and providing the requested services to the customer. Cloud infrastructure system 502 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 502 may provide services to multiple customers in parallel. Cloud infrastructure system 502 may store information for these customers, including possibly proprietary information. In certain examples, cloud infrastructure system 502 includes an identity management subsystem (IMS) 528 that is configured to manage customer information and provide the separation of the managed information such that information related to one customer is not accessible by another customer. IMS 528 may be configured to provide various security-related services such as identity services, such as information access management, authentication and authorization services, services for managing customer identities and roles and related capabilities, and the like.

Figure 6:
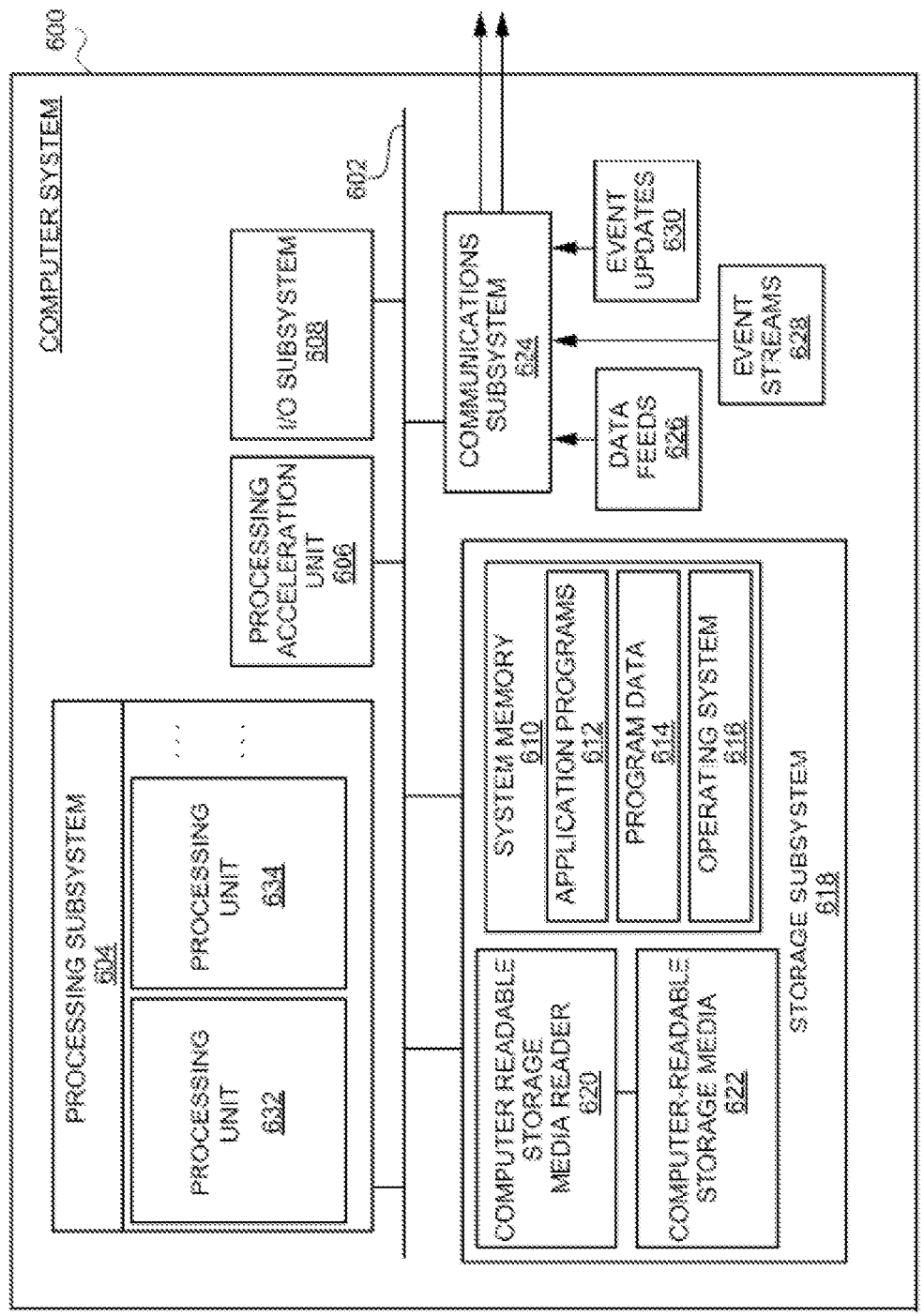
FIG. 6 illustrates an example computer system that may be used to implement various embodiments.

FIG. 6 illustrates an example of computer system 600. In some examples, computer system 600 may be used to implement the topic categorization system within a distributed environment, and various servers and computer systems described above. As shown in FIG. 6, computer system 600 includes various subsystems including a processing subsystem 604 that communicates with a number of other subsystems via a bus subsystem 602. These other subsystems may include a processing acceleration unit 606, an I/O subsystem 608, a storage subsystem 618, and a communications subsystem 624. Storage subsystem 618 may include non-transitory computer-readable storage media including storage media 622 and a system memory 610.

Bus subsystem 602 provides a mechanism for letting the various components and subsystems of computer system 600 communicate with each other as intended. Although bus subsystem 602 is shown schematically as a single bus, alternative examples of the bus subsystem may utilize multiple buses. Bus subsystem 602 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 604 controls the operation of computer system 600 and may include one or more processors, application specific integrated circuits (ASICs), or field programmable gate arrays (FPGAs). The processors may include be single core or multicore processors. The processing resources of computer system 600 may be organized into one or more processing units 632, 634, etc. A processing unit may include one or more processors, one or more cores from the same or different processors, a combination of cores and processors, or other combinations of cores and processors. In some examples, processing subsystem 604 may include one or more special purpose co-processors such as graphics processors, digital signal processors (DSPs), or the like. In some examples, some or all of the processing units of processing subsystem may be implemented using customized circuits, such as application specific integrated circuits (ASICs), or field programmable gate arrays (FPGAs).

In some examples, the processing units in processing subsystem 604 may execute instructions stored in system memory 610 or on computer-readable storage media 622. In various examples, the processing units may execute a variety of programs or code instructions and may maintain multiple concurrently executing programs or processes. At any given time, some or all of the program code to be executed may be resident in system memory 610 and/or on computer-readable storage media 622 including potentially on one or more storage devices. Through suitable programming, processing subsystem 604 may provide various functionalities described above. In instances where computer system 600 is executing one or more virtual machines, one or more processing units may be allocated to each virtual machine.

In certain examples, a processing acceleration unit 606 may optionally be provided for performing customized processing or for off-loading some of the processing performed by processing subsystem 604 so as to accelerate the overall processing performed by computer system 600.

I/O subsystem 608 may include devices and mechanisms for inputting information to computer system 600 and/or for outputting information from or via computer system 600. In general, use of the term input device is intended to include all possible types of devices and mechanisms for inputting information to computer system 600. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 600 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 618 provides a repository or data store for storing information and data that is used by computer system 600. Storage subsystem 618 provides a tangible non-transitory computer-readable storage medium for storing the basic programming and data constructs that provide the functionality of some examples. Storage subsystem 618 may store software (e.g., programs, code modules, instructions) that when executed by processing subsystem 604 provides the functionality described above. The software may be executed by one or more processing units of processing subsystem 604. Storage subsystem 618 may also provide authentication in accordance with the teachings of this disclosure.

Storage subsystem 618 may include one or more non-transitory memory devices, including volatile and non-volatile memory devices. As shown in FIG. 6, storage subsystem 618 includes a system memory 610 and a computer-readable storage media 622. System memory 610 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 600, such as during start-up, may typically be stored in the ROM. The RAM typically contains data and/or program modules that are presently being operated and executed by processing subsystem 604. In some implementations, system memory 610 may include multiple different types of memory, such as static random access memory (SRAM), dynamic random access memory (DRAM), and the like.

By way of example, and not limitation, as depicted in FIG. 6, system memory 610 may load application programs 612 that are being executed, which may include various applications such as Web browsers, mid-tier applications, relational database management systems (RDBMS), etc., program data 614, and an operating system 616. By way of example, operating system 616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 622 may store programming and data constructs that provide the functionality of some examples. Computer-readable media 622 may provide storage of computer-readable instructions, data structures, program modules, and other data for computer system 600. Software (programs, code modules, instructions) that, when executed by processing subsystem 604 provides the functionality described above, may be stored in storage subsystem 618. By way of example, computer-readable storage media 622 may include non-volatile memory such as a hard disk drive, a magnetic disk drive, an optical disk drive such as a CD ROM, DVD, a Blu-Ray® disk, or other optical media. Computer-readable storage media 622 may include, but is not limited to, Zip® drives, flash memory cards, universal serial bus (USB) flash drives, secure digital (SD) cards, DVD disks, digital video tape, and the like. Computer-readable storage media 622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 618 may also include a computer-readable storage media reader 620 that may further be connected to computer-readable storage media 622. Reader 620 may receive and be configured to read data from a memory device such as a disk, a flash drive, etc.

In certain examples, computer system 600 may support virtualization technologies, including but not limited to virtualization of processing and memory resources. For example, computer system 600 may provide support for executing one or more virtual machines. In certain examples, computer system 600 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 600. Accordingly, multiple operating systems may potentially be run concurrently by computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to establish a communication channel to one or more client devices via the Internet for receiving and sending information from and to the client devices.

Communication subsystem 624 may support both wired and/or wireless communication protocols. In certain examples, communications subsystem 624 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 602.XX family standards, or other mobile communication technologies, or any combination thereof), global positioning system (GPS) receiver components, and/or other components. In some examples, communications subsystem 624 may provide wired network connectivity (e.g., Ethernet) in addition to or instead of a wireless interface.

Communication subsystem 624 may receive and transmit data in various forms. In some examples, in addition to other forms, communications subsystem 624 may receive input communications in the form of structured and/or unstructured data feeds 626, event streams 628, event updates 630, and the like. For example, communications subsystem 624 may be configured to receive (or send) data feeds 626 in real-time from users of social media networks and/or other communication services such as Twitter® feeds, Facebook° updates, web feeds such as Rich Site Summary (RSS) feeds, and/or real-time updates from one or more third party information sources.

In certain examples, communications subsystem 624 may be configured to receive data in the form of continuous data streams, which may include event streams 628 of real-time events and/or event updates 630, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 may also be configured to communicate data from computer system 600 to other computer systems or networks. The data may be communicated in various different forms such as structured and/or unstructured data feeds 626, event streams 628, event updates 630, and the like to one or more databases that may be in communication with one or more streaming data source computers coupled to computer system 600.

Computer system 600 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 600 depicted in FIG. 6 is intended only as a specific example. Many other configurations having more or fewer components than the system depicted in FIG. 6 are possible. Based on the disclosure and teachings provided herein, it should be appreciated there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
obtaining a record comprising a text narration corresponding to context for the record;
generating, by a natural language processing (NLP) model, an encoded narration based on the text narration;
determining a first similarity index between the encoded narration and each encoded reference topic of a plurality of encoded reference topics that correspond to a plurality of predetermined reference topics, respectively;
determining whether the first similarity index between the encoded narration and each encoded reference topic is equal to or greater than a similarity threshold;
when the first similarity index is equal to or greater than the similarity threshold, adding a respective reference topic of the plurality of predetermined reference topics that corresponds to the encoded reference topic associated with the first similarity index to a first result group;
when the first similarity index is less than the similarity threshold, leaving the respective reference topic out of the first result group; and
classifying the record based on a reference topic included in the first result group that corresponds to the encoded reference topic associated with a greatest similarity index within the first result group,
wherein the computer-implemented method further comprises:
based on the first similarity index being less than the similarity threshold:
determining that the encoded narration corresponds to a non-matchable text narration;
performing web scraping based on the non-matchable text narration, to obtain contextual information contextually similar to the non-matchable text narration;
generating, by the NLP model, encoded contextual information based on the contextual information;
determining a second similarity index between the encoded contextual information and each encoded reference topic of the plurality of encoded reference topics;
comparing the second similarity index between the encoded contextual information and each encoded reference topic to the similarity threshold;
when the second similarity index is equal to or greater than the similarity threshold, determining one or more reference topics among the plurality of predetermined reference topics that corresponds to one or more encoded reference topics associated with the second similarity index, respectively, as matching the non-matchable text narration;
adding the one or more reference topics to a second result group; and
classifying the record corresponding to the non-matchable text narration based on a reference topic that is included in the second result group and corresponds to the encoded reference topic having a greatest similarity index within the second result group.

2. The computer-implemented method of claim 1, wherein
the web scraping is performed using a search application programming interface (API).

3. The computer-implemented method of claim 1, further comprising:
associating, in a look-up table, the non-matchable text narration, the contextual information, and the reference topic classified for the record corresponding to the non-matchable text narration.

4. The computer-implemented method of claim 1, wherein the obtaining the record comprises:
extracting, from the record, a narration for the record, and
preprocessing the narration, to obtain a preprocessed narration, the preprocessing comprising at least one from among (i) removing, from the narration, at least one number, (ii) removing, from the narration, non-contextual text, (iii) removing, from the narration, at least one special character, and (iv) performing part-of-speech (POS) tagging on predetermined POS words of the narration and removing, from the narration, at least one word that is not among the predetermined POS words, and
wherein the preprocessed narration is the text narration.

5. The computer-implemented method of claim 1, further comprising:
prior to the determining the first similarity index, receiving a plurality of reference topics from a plurality of sources;
preprocessing the plurality of reference topics;
inputting the preprocessed plurality of reference topics into the NLP model;
generating, by the NLP model, the plurality of encoded reference topics; and
storing, in a database, the plurality of encoded reference topics.

6. The computer-implemented method of claim 1, wherein:
the record is one of a plurality of records associated with an entity, each of the plurality of records comprising a text narration associated therewith,
the computer-implemented method further comprises providing a report to a computer of the entity, the report classifying the plurality of records into reference topics corresponding to some encoded reference topics among the plurality of encoded reference topics, and
each of the some encoded reference topics has a greatest similarity index within the first result group corresponding to each of the plurality of records.

7. The computer-implemented method of claim 1, wherein:
the NLP model comprises a Bidirectional Encoder Representations from Transformers (BERT) model, and
the generating the encoded narration comprises generating embeddings by converting the text narration into a 768-dimensional vector space.

8. The computer-implemented method of claim 7, further comprising:
prior to the determining the first similarity index, receiving a plurality of reference topics from a plurality of sources; and
generating, by the NLP model, embeddings for each of the plurality of reference topics, by converting each of the plurality of reference topics into a 768-dimensional vector space, thereby generating the plurality of encoded reference topics,
wherein the determining the first similarity index comprises calculating a cosine similarity index as:

$$\text{Cos}(x,y) = x \cdot y / \|x\| * \|y\|,$$

where "x·y" is a product (dot) of a vector x and a vector y,
$\|x\|$ is a length of the vector x,
$\|y\|$ is a length of the vector y,
$\|x\|*\|y\|$ is a cross-product of the vector x and the vector y,
the vector x represents embeddings of the text narration, and
the vector y represents embeddings of a given reference topic among the plurality of reference topics.

9. A system comprising:
one or more data processors; and
one or more non-transitory computer-readable media storing instructions that, when executed by the one or more data processors, cause the one or more data processors to perform a method including:
obtaining a record comprising a text narration corresponding to context for the record;
generating, by a natural language processing (NLP) model, an encoded narration based on the text narration;
determining a first similarity index between the encoded narration and each encoded reference topic of a plurality of encoded reference topics that correspond to a plurality of predetermined reference topics, respectively;
determining whether the first similarity index between the encoded narration and each encoded reference topic is equal to or greater than a similarity threshold;
when the first similarity index is equal to or greater than the similarity threshold, adding a respective reference topic of the plurality of predetermined reference topics that corresponds to the encoded reference topic associated with the first similarity index to a first result group;
when the first similarity index is less than the similarity threshold, leaving the respective reference topic out of the first result group; and
classifying the record based on a reference topic included in the first result group that corresponds to the encoded reference topic associated with a greatest similarity index-within the first result group,
wherein the method further includes:
based on the first similarity index being less than the similarity threshold:
determining that the encoded narration corresponds to a non-matchable text narration;
performing web scraping based on the non-matchable text narration, to obtain contextual information contextually similar to the non-matchable text narration;
generating, by the NLP model, encoded contextual information based on the contextual information;
determining a second similarity index between the encoded contextual information and each encoded reference topic of the plurality of encoded reference topics;
comparing the second similarity index between the encoded contextual information and each encoded reference topic to the similarity threshold;
when the second similarity index is equal to or greater than the similarity threshold, determining one or more reference topics among the plurality of predetermined reference topics that corresponds to one or more encoded reference topics associated with the second similarity index, respectively, as matching the non-matchable text narration;
adding the one or more reference topics to a second result group; and
classifying the record corresponding to the non-matchable text narration based on a reference topic that is included in the second result group and corresponds to the encoded reference topic having a greatest similarity index within the second result group.

10. The system of claim 9, wherein
the web scraping is performed using a search application programming interface (API).

11. The system of claim 9, wherein the method further includes:
associating, in a look-up table, the non-matchable text narration, the contextual information, and the reference topic classified for the record corresponding to the non-matchable text narration.

12. The system of claim 9, wherein the obtaining the record includes:
extracting, from the record, a narration for the record, and
preprocessing the narration, to obtain a preprocessed narration, the preprocessing including at least one from among (i) removing, from the narration, at least one number, (ii) removing, from the narration, non-contextual text, (iii) removing, from the narration, at least one special character, and (iv) performing part-of-speech (POS) tagging on predetermined POS words of the narration and removing, from the narration, at least one word that is not among the predetermined POS words, and wherein the preprocessed narration is the text narration.

13. The system of claim 9, wherein:
the NLP model comprises a Bidirectional Encoder Representations from Transformers (BERT) model, and
the generating the encoded narration includes generating embeddings by converting the text narration into a 768-dimensional vector space.

14. The system of claim 13, wherein the method further includes:
prior to the determining the first similarity index, receiving a plurality of reference topics from a plurality of sources;
generating, by the NLP model, embeddings for each of the plurality of reference topics, by converting each of the plurality of reference topics into a 768-dimensional vector space, thereby generating the plurality of encoded reference topics; and
storing, in a database, the plurality of encoded reference topics,
wherein the determining the first similarity index includes calculating a cosine similarity index as:

$$\text{Cos}(x,y) = x \cdot y / \|x\| * \|y\|,$$

where "x·y" is a product (dot) of a vector x and a vector y,
$\|x\|$ is a length of the vector x,
$\|y\|$ is a length of the vector y,
$\|x\| * \|y\|$ is a cross-product of the vector x and the vector y,
the vector x represents embeddings of the text narration, and
the vector y represents embeddings of a given reference topic among the plurality of reference topics.

15. A computer-program product tangibly embodied in one or more non-transitory machine-readable media including instructions configured to cause one or more data processors to perform a method including:
obtaining a record comprising a text narration corresponding to context for the record;
generating, by a natural language processing (NLP) model, an encoded narration based on the text narration;
determining a first similarity index between the encoded narration and each encoded reference topic of a plurality of encoded reference topics that correspond to a plurality of predetermined reference topics, respectively;
determining whether the first similarity index between the encoded narration and each encoded reference topic is equal to or greater than a similarity threshold;
when the first similarity index is equal to or greater than the similarity threshold, adding a respective reference topic of the plurality of predetermined reference topics that corresponds to the encoded reference topic associated with the first similarity index to a first result group;
when the first similarity index is less than the similarity threshold, leaving the respective reference topic out of the first result group; and
classifying the record based on a reference topic included in the first result group that corresponds to the encoded reference topic associated with a greatest similarity index-within the first result group,
wherein the method further includes:
based on the first similarity index being less than the similarity threshold:
determining that the encoded narration corresponds to a non-matchable text narration;
performing web scraping based on the non-matchable text narration, to obtain contextual information contextually similar to the non-matchable text narration;
generating, by the NLP model, encoded contextual information based on the contextual information;
determining a second similarity index between the encoded contextual information and each encoded reference topic of the plurality of encoded reference topics;
comparing the second similarity index between the encoded contextual information and each encoded reference topic to the similarity threshold;
when the second similarity index is equal to or greater than the similarity threshold, determining one or more reference topics among the plurality of predetermined reference topics that corresponds to one or more encoded reference topics associated with the second similarity index, respectively, as matching the non-matchable text narration;
adding the one or more reference topics to a second result group; and
classifying the record corresponding to the non-matchable text narration based on a reference topic that is included in the second result group and corresponds to the encoded reference topic having a greatest similarity index within the second result group.

16. The computer-program product of claim 15, wherein the web scraping is performed using a search application programming interface (API).

17. The computer-program product of claim 15, wherein the method further includes:
associating, in a look-up table, the non-matchable text narration, the contextual information, and the reference topic classified for the record corresponding to the non-matchable text narration.

18. The computer-program product of claim 15, wherein the obtaining the record includes:
extracting, from the record, a narration for the record, and preprocessing the narration, to obtain a preprocessed narration, the preprocessing including at least one from among (i) removing, from the narration, at least one number, (ii) removing, from the narration, non-contextual text, (iii) removing, from the narration, at least one special character, and (iv) performing part-of-speech (POS) tagging on predetermined POS words of the narration and removing, from the narration, at least one word that is not among the predetermined POS words, and
wherein the preprocessed narration is the text narration.

19. The computer-program product of claim 15, wherein:
the NLP model comprises a Bidirectional Encoder Representations from Transformers (BERT) model, and
the generating the encoded narration includes generating embeddings by converting the text narration into a 768-dimensional vector space.

20. The computer-program product of claim 19, wherein the method further includes:
prior to the determining the first similarity index, receiving a plurality of reference topics from a plurality of sources;

generating, by the NLP model, embeddings for each of the plurality of reference topics, by converting each of the plurality of reference topics into a 768-dimensional vector space, thereby generating the plurality of encoded reference topics; and storing, in a database, the plurality of encoded reference topics, wherein the determining the first similarity index includes calculating a cosine similarity index as:

$$\mathrm{Cos}(x,y) = x \cdot y / \|x\| * \|y\|,$$

where "x·y" is a product (dot) of a vector x and a vector y, $\|x\|$ is a length of the vector x, $\|y\|$ is a length of the vector y, $\|x\|*\|y\|$ is a cross-product of the vector x and the vector y, the vector x represents embeddings of the text narration, and the vector y represents embeddings of a given reference topic among the plurality of reference topics.

* * * * *